United States Patent
Jia et al.

(10) Patent No.: US 10,214,862 B2
(45) Date of Patent: Feb. 26, 2019

(54) CASING TUBE AND MANUFACTURING METHOD THEREOF

(71) Applicant: NINGBO SHUXIANG NEW MATERIAL CO., LTD., Ningbo, Zhejiang (CN)

(72) Inventors: Baoqi Jia, Ningbo (CN); Ming Fang, Ningbo (CN); Hui Chi, Ningbo (CN)

(73) Assignee: NINGBO SHUXIANG NEW MATERIAL CO., LTD, Ningbo, Zhejiang (CN)

( * ) Notice: Subject to any disclaimer, the term of this patent is extended or adjusted under 35 U.S.C. 154(b) by 165 days.

(21) Appl. No.: 15/304,847

(22) PCT Filed: Apr. 17, 2015

(86) PCT No.: PCT/CN2015/076875
§ 371 (c)(1),
(2) Date: Oct. 17, 2016

(87) PCT Pub. No.: WO2015/158303
PCT Pub. Date: Oct. 22, 2015

(65) Prior Publication Data
US 2017/0183828 A1 Jun. 29, 2017

(30) Foreign Application Priority Data
Apr. 17, 2014 (CN) .......................... 2014 1 0154166

(51) Int. Cl.
*F16B 37/00* (2006.01)
*E01B 9/14* (2006.01)
(Continued)

(52) U.S. Cl.
CPC ................ *E01B 9/14* (2013.01); *B29C 43/02* (2013.01); *B29C 65/562* (2013.01);
(Continued)

(58) Field of Classification Search
CPC ........ F16B 33/006; F16B 37/00; F16B 37/04; F16B 37/041; F16B 37/047;
(Continued)

(56) References Cited

U.S. PATENT DOCUMENTS 766,206 A * 8/1904 Westling ................ B65D 39/04
217/110
2,826,631 A * 3/1958 Rohe ..................... F16B 33/004
174/138 R
(Continued)

*Primary Examiner* — Roberta S Delisle
(74) *Attorney, Agent, or Firm* — Raymond Y. Chan; David and Raymond Patent Firm

(57) ABSTRACT

A pre-buried casing tube uses glass fiber reinforced resin as the raw material to enhance the operation strength of the pre-buried casing tube, extend the service life of the pre-buried casing tube, and reduce maintenance cost of the railway transport system. The pre-buried casing tube includes at least one casing tube body, each casing tube body including at least one retaining element, the retaining elements provided in intervals along one side of the casing tube, each casing tube body disposed adjacently so as to form a passage for a screw, each retaining element provided in the passage for the screw.

6 Claims, 31 Drawing Sheets

(51) Int. Cl.
*E01B 9/18* (2006.01)
*B29C 43/02* (2006.01)
*B29C 65/56* (2006.01)
*B29C 65/00* (2006.01)
*B29C 70/06* (2006.01)
*B29C 70/46* (2006.01)
*B29K 105/08* (2006.01)
*B29K 105/12* (2006.01)
*B29K 309/08* (2006.01)
*B29L 23/00* (2006.01)
*E01B 9/60* (2006.01)
*B29C 65/50* (2006.01)
*F16B 37/12* (2006.01)

(52) U.S. Cl.
CPC ........ *B29C 66/547* (2013.01); *B29C 66/7212* (2013.01); *B29C 70/06* (2013.01); *B29C 70/46* (2013.01); *E01B 9/18* (2013.01); *F16B 37/00* (2013.01); *B29C 65/5014* (2013.01); *B29C 65/5042* (2013.01); *B29C 65/5057* (2013.01); *B29C 65/5071* (2013.01); *B29C 66/1312* (2013.01); *B29C 66/223* (2013.01); *B29C 66/71* (2013.01); *B29C 66/72143* (2013.01); *B29C 66/73941* (2013.01); *B29K 2105/08* (2013.01); *B29K 2105/12* (2013.01); *B29K 2309/08* (2013.01); *B29L 2023/22* (2013.01); *E01B 9/60* (2013.01); *F16B 37/122* (2013.01)

(58) Field of Classification Search
CPC .. F16B 37/0885; F16B 37/0892; F16B 37/12; F16B 37/122; E01B 9/14
USPC ........ 411/172, 175, 178, 182, 432, 900–901, 411/908
See application file for complete search history.

(56) References Cited

U.S. PATENT DOCUMENTS

| | | | | |
|---|---|---|---|---|
| 3,041,088 | A * | 6/1962 | Brandon, Jr. | F16B 37/0885 285/33 |
| 3,160,189 | A * | 12/1964 | Hughes | F16B 37/048 411/178 |
| 3,281,173 | A * | 10/1966 | Rosan | F16B 37/122 403/242 |
| 4,274,323 | A * | 6/1981 | Resnicow | F16B 43/007 411/427 |
| 5,039,266 | A * | 8/1991 | Nagayoshi | F16B 37/0885 411/433 |
| 5,156,507 | A * | 10/1992 | Underbrink | F16B 13/066 411/63 |
| 6,350,093 | B1 * | 2/2002 | Petersen | F16B 33/002 411/178 |
| 6,676,352 | B2 * | 1/2004 | Chen-Chi | F16B 37/125 411/178 |
| 6,712,572 | B2 * | 3/2004 | Bisping | F16B 13/0825 411/60.1 |
| 7,465,136 | B2 * | 12/2008 | Nagayama | B21K 1/56 411/178 |
| 7,735,667 | B2 * | 6/2010 | Schutz | F16B 37/0885 215/274 |
| 8,061,945 | B2 * | 11/2011 | Smith | F16B 37/0857 411/267 |
| 8,206,071 | B1 * | 6/2012 | Johnson | B25B 13/065 411/178 |
| 2007/0286702 | A1 * | 12/2007 | Smith | F16B 37/0857 411/432 |
| 2010/0158635 | A1 * | 6/2010 | Rodman | F16B 37/0864 411/432 |

* cited by examiner

Step 1: preparing a mixture of fiberglass and resin, wherein the mixture has a strip shape.
Step 2: binding the mixture on a mould core 1000 to obtain a billet for the casing tube 10.
Step 3: mould pressing the billet to fasten and mold the billet.
Step 4: demolding, and removing the mould core 1000 to obtain the casing tube 10.
Fig.20

Step (a): mixing the fiberglass and the resin to get a mixture of the fiberglass and the resin

Step (b): pressing the mixture to composite and mold the mixture to obtain a tube body 11, wherein the tube body 11 has at least a retaining element 111

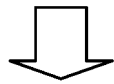

Step (c): coupling at least two of the tube bodies 11 with each other to form a screw channel 12 therewithin, wherein the retaining element 111 is located in the screw channel 12 to form the casing tube 10

FIG. 21

(1) preparing the fiberglass reinforced resin composite material.

(2) making the fiberglass reinforced resin composite material be in a sol state.

(3) gelling the fiberglass reinforced resin composite material via the casing tube 10 module and demolding to obtain the casing tube 10, wherein the casing tube 10 has a screw channel 12 and a thread portion provided in the screw channel 12.

Fig.22

(I): providing at least two tube bodies 11, wherein each of the tube bodies 11 has a curved inner-side surface 130 and at least a retaining element 111 provided at the curved inner-side surface 103

(II): coupling the tube bodies 11 with each other to form a screw channel 12 within the curved inner-side surfaces 130 of the tube bodies 11 to form the casing tube 10, wherein each of the retaining elements 111 is formed in the screw channel 12

FIG. 23

(A): preparing a billet for the tube body, wherein the size of the billet is no lesser than the size of the tube body

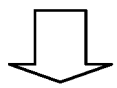

(B): cutting the billet to obtain the tube body 11, wherein the tube body 11 has a curved inner-side surface 130 and at least one retaining element 111 provided at the curved inner-side surface 130

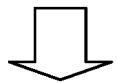

(C): coupling at least two of the tube bodies 11 with each other to form a screw channel 12 within the curved inner-side surfaces 130 of the tube bodies 11 so as to form the casing tube 10, wherein each of the retaining elements 111 is formed in the screw channel 12

FIG. 24

CASING TUBE AND MANUFACTURING
METHOD THEREOF

CROSS REFERENCE OF RELATED
APPLICATION

This is a non-provisional application that claims priority to International Application Number PCT/CN/2015/158303, filed Apr. 17, 2015, which claims priority under 35 U.S.C. 119(a-d) to Chinese application number 201410036845.6, filed Apr. 17, 2014.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT
INVENTION

Field of Invention

The present invention relates to a casing tube and manufacturing method thereof, and particularly to a pre-buried casing tube to fasten the rails with the sleeper during laying the railway transportation system, wherein the casing tube is made of fiberglass reinforced resin composite which is internally dispersed evenly and stable in structure as to enforce strength of the casing tube for satisfying requirements of the casing tube in railway transportation system.

Description of Related Arts

The railway transportation system, especially for a wheeled vehicle running on rails, is an overland transportation to transport passengers or goods. The development of the railway transportation plays an important part in the stability and sustainable development of the modern society.

The railway transportation, represented by new transportation mode such as high-speed rail, subway and express rail line, is a powerful transportation tool and can effectively improve the unbalanced distribution of physical resources and human resources geographically and make the distance of people closer. Therefore, the recent railway transportation system are rapidly improved with worldwide popularity.

The entire railway transportation system, which is a unified whole system, comprises at least a preset railroad and wheeled vehicles running on the railroad. In other words, the railroad is a necessary component of the railway transportation system.

The railroad comprises a plurality of interlinked rails and a plurality of sleepers, wherein the rails are anchored to the sleepers which are provided on the rail-bed at regular intervals, wherein one function of the rail-bed is to support the sleepers and transmit the huge load from the upward of the sleepers to the foundation so as to reduce deformation of the foundation for the sustainability of the railway transportation system. After the rails lay on the sleepers, the major problem is to fasten rails on sleepers stably and reliably. Traditionally, as the sleeper has been molded integrally, a pre-embedded casing tube 10P is placed at the preset position (as shown in FIG. 1) for securely fasten the pre-embedded casing tube 10P in the sleeper. Then by means of screwing, the rail is fastened on the sleeper.

As shown in FIG. 1, the traditional pre-embedded casing tube 10P is made of "nylon 66" integrally. Specifically, the pre-embedded casing tube 10P has a screw channel 11P, wherein the inner surface of pre-embedded casing tube 10P forms a thread portion to define the screw channel 11P for fastening the rail on the sleeper by a screw. The outer surface of pre-embedded casing tube 10P further comprises a preset thread portion. As the sleeper being molded, the pre-embedded casing tube 10P is provided on the preset position, and is molded with the sleeper integrally to fasten the pre-embedded casing tube 10P in the sleeper stably. However, as the sleeper has been molded, the pre-embedded casing tube 10P is fastened to the sleeper linearly. In actual situation, because of sustained mechanical vibrations from the vehicle to the preset rail, it is easy for the pre-embedded casing tube 10P rotated at the clockwise and the counter-clockwise directions along the outer surface of the pre-embedded casing tube 10P and even dropped from the sleeper. These cause serious damages to operation security of the railway transportation system.

Moreover, the pre-embedded casing tube 10P is made of nylon 66. But the strength of nylon 66 is hard to resist the stress generated from sustained mechanical vibrations from the vehicle to the preset railroad for the pre-embedded casing tube 10P. It is relatively easy to shear one set of thread portion in the inner surface of the pre-embedded casing tube 10P by the screw after a period of continuous use. This reason will accelerate the aging of the tradition pre-embedded casing tube 10P. Therefore, the accelerated aging of the pre-embedded casing tube 10P leads to two problems directly. The first problem is the high cost for maintenance of preset railroad. The second problem is the uncertainty of sustainability and security in the railway transportation system.

Otherwise, because of physical properties of nylon 66, there are further three problems of the pre-embedded casing tube 10P.

In relative moist environment, the pre-embedded casing tube 10P will have certain strength after oxidation. However, in actual application, the environment of the pre-embedded casing tube 10P in different locations or environments will have different strengths. In an elevated location, such as Tibet Plateau, the humidity is relatively low that the pre-embedded casing tube 10P is too fragile to resist the stress from sustained mechanical vibrations from the vehicle to the preset railroad. It is easy to damage even using the pre-embedded casing tube 10P in enforced nylon 66. This is the reason of high cost, great difficulty and accelerated damaging of the pre-embedded casing tube 10P in the elevated locations compared to the humid region for laying preset railroads. Also, the corrosion resistance and abrasive resistance of nylon 66 are not good enough which strongly limits application of the pre-embedded casing tube 10P and effects the lifetime of the pre-embedded casing tube 10P negatively.

On the other hand, nylon 66 is easy to be thermal-degraded. As vehicles running on the preset railroad at high speed, the railroad is getting hotter because of the friction of vehicles and railroads. With the increasing temperature of railroad, the environmental temperature of the pre-embedded casing tube 10P will be higher. Under such high environmental temperature for a long period of time, the nylon 66 made pre-embedded casing tube 10P will be thermal-degraded. The thermal degradation mainly shows as cracking of main chain which leads to reduction of molecular weight and melt viscosity. In further degradation, the three-dimensional structure of nylon 66 causes the increase of melt viscosity to be a gel form, and eventually to be insoluble and infusible matter. Therefore, this is a main reason why the durability of the traditional pre-embedded casing tube 10P is low.

Furthermore, as the pre-embedded casing tube 10P is in the humid environment for a long period of time, the insulation ability of the pre-embedded casing tube 10P will be lower and even normal signal transmission will be damaged which is a potential danger to security.

SUMMARY OF THE PRESENT INVENTION

The invention is advantageous in that it provides a casing tube and manufacturing method thereof, wherein the pre-buried casing tube is made of fiberglass reinforced resin composite which is dispersed evenly internally and stable in structure as to enforce strength of the casing tube for satisfying the needs of the casing tube in railway transportation system.

Another advantage of the invention is to provide a casing tube and manufacturing method thereof, wherein molecules of the fiberglass reinforced resin composite forms reticulate cubic structure so that the casing tube is has higher strength and specific modulus to enforce the consistency and concordance of internal structure of the casing tube made by the fiberglass reinforced resin composite.

Another advantage of the invention is to provide a casing tube and manufacturing method thereof, wherein when the casing tube is used, especially under an extreme environment, the casing tube will not block the signal transmission to ensure the continuity of signal transmission for the security of railway running.

Another advantage of the invention is to provide a casing tube and manufacturing method thereof, wherein the casing tube has at least one locating element. As the casing tube is fastened at the preset position, the material to make sleeper will be flowed and permeated to solidify into a locating slot formed by every two of the adjacent locating elements so that sleeper and the casing tube is meshed with each other. In this way, it can increase the mash force between sleeper and the casing tube to ensure the reliability when using the casing tube.

Another advantage of the invention is to provide a casing tube and manufacturing method thereof, wherein each of the locating element is spacedly provided on outer surface of the casing tube, whereby the vertical force relationship is formed between the casing tube and the sleeper so that the mesh force between each of the locating element of the outer surface of the casing tube and the sleeper is larger.

Another advantage of the invention is to provide a casing tube and manufacturing method thereof, wherein the casing tube can be pre-embedded in the sleeper alone to improve the efficiency of laying railway system.

Another advantage of the invention is to provide a casing tube and manufacturing method thereof, wherein while laying the railway system, the screw can be pre-embedded in the sleeper, then rail is fastened to the sleeper by the casing tube to form railway system.

Another advantage of the invention is to provide a casing tube and manufacturing method thereof, wherein each of the tube bodies comprises a first body and a second body, wherein the first body is made of the fiberglass reinforced resin composite formed by long fiberglass and resin mixed with each other, wherein the second body is made of the fiberglass reinforced resin composite formed by short fiberglass and resin mixed with each other. The inner surface and outer surface of the casing tube is formed by the first body and the second body respectively for bearing different characters of force by inner portion and outer portion of the casing tube.

Another advantage of the invention is to provide a casing tube and manufacturing method thereof, wherein each of the tube bodies of the casing tube comprises a holding member and a holding slot, wherein as the tube bodies are coupled with each other, the holding member can be held in the holding slot, so that when the casing tube bears transverse impact force, the casing tubes will not be malpositioned to increase the reliably thereof.

Another advantage of the invention is to provide a casing tube and manufacturing method thereof, wherein each of the tube bodies of the casing tube comprises a holding member and a holding slot, wherein as the tube bodies are coupled with each other, the holding member can be held in the holding slot, so that the connection between the tube bodies is effectively sealed, whereby the material formed the sleeper won't be permeated into the casing tube through the connection of the tube bodies as pre-embedding the casing tube in the sleeper.

Another advantage of the invention is to provide a casing tube and manufacturing method thereof, wherein each side portion of the casing tube comprises a set of locating tooth, as the tube bodies are coupled with each other, the locating teeth of the tube bodies are meshed with each other, so that the adjacent casing tubes will not be malpositioned between the tube bodies when the casing tube bears sustained up and down vibrations.

Another advantage of the invention is to provide a casing tube and manufacturing method thereof, wherein the casing tube made by the fiberglass reinforced resin composite has lower cost.

Another advantage of the invention is to provide a casing tube and manufacturing method thereof, wherein the casing tube is hard to damage which reduces maintenance cost for railway transformation system.

Another advantage of the invention is to provide a casing tube and manufacturing method thereof, wherein the casing tube is simple in structure and durable in aging without complex manufacturing process and expensive material. With lower manufacturing cost, the casing tube has a promising market.

Additional advantages and features of the invention will become apparent from the description which follows, and may be realized by means of the instrumentalities and combinations particular point out in the appended claims.

According to the present invention, the foregoing and other objects and advantages are attained by a casing tube for engaging with a screw, comprising:

at least two tube bodies, each of the tube bodies having an inner-side surface and at least one retaining element provided on the inner-side surface, wherein when the tube bodies are coupled with each other, the inner-side surfaces of the tube bodies define a screw channel therebetween to receive the screw therein, wherein the retaining element of each of the tube bodies is provided for engaging with the screw.

According to the embodiments of the present invention, the retaining element of each of the tube bodies defines a thread portion adapted to engage with the screw.

According to the embodiments of the present invention, each of the tube bodies has an outer-side surface and at least one locating element provided on the outer-side surface.

According to the embodiments of the present invention, the casing tube further comprising at least one fastening unit, which each of the fastening units is provided on the outer-side surface of the tube body to provide a binding force for the tube body.

According to the embodiments of the present invention, the fastening units are spacedly encircled around the outer surfaces of the tube bodies.

According to the embodiments of the present invention, each of the tube bodies has a first side portion and a second side portion, wherein the first side portion and the second side portion are respectively and radially extended from the tube body and the first side portion and the second side portion of the tube bodies are coupled with each other.

According to the embodiments of the present invention, the casing tube further comprises at least one binding layer, wherein the binding layer is provided between the first side portion and the second side portion of the tube bodies for connecting the two tube bodies with each other by the binding layer.

According to the embodiments of the present invention, the distance between the inner-side surface and the outer-side surface is smaller than the thickness of the first side portion and the second side portion.

According to the embodiments of the present invention, the casing tube has two tube bodies, which are symmetric with each other so as to define the screw channel between the inner-side surfaces of the two tube bodies, wherein the tube body further has a holding member provided at the first side portion and a holding slot provided in the second side portion, wherein when the two tube bodies are coupled with each other, the holding member is engaged with the holding slot.

According to the embodiments of the present invention, one tube body has two holding members provided respectively at the first side portion and the second side portion thereof, and another tube body has two holding slots provided respectively in the first side portion and the second side portion thereof such that when the tube bodies are coupled with each other, the holding members are engaged with the holding slots respectively.

According to the embodiments of the present invention, each of the tube bodies comprises a first body and a second body, wherein the first body and the second body are overlapped with each other to form the tube body, wherein the retaining element is defined by the second body, and the locating element is defined by the first body.

According to the embodiments of the present invention, the first body is made of long fiberglass and resin mixed with each other, and the second body is made of short fiberglass and resin mixed with each other.

According to the embodiments of the present invention, each of the fastening units has a strip shape and made of fiberglass and resin mixed with each other.

According to the embodiments of the present invention, each of the fastening unit has a ring shape, and is made of elastic material, so that at the normal state of the fastening unit, which is not stretched by any force, the diameter of the fastening unit is smaller than the diameter of the casing tube, and when the fastening unit is encircled around the casing tube, the fastening unit provides a binding force around the casing tube.

According to the present invention, the foregoing and other objects and advantages are attained by a casing tube, comprising:

a tube body, wherein the tube body has an inner-side surface and an outer-side surface corresponding to the inner-side surface, wherein the inner-side surface of the tube body defines a screw channel and a thread portion, wherein the screw channel is provided to receive a screw therein, and the thread portion is provided for screwing the screw, wherein the tube body has at least one locating element provided on the inner-side surface for locating a sleeper thereat.

According to the embodiments of the present invention, the locating elements are spacedly provided on the outer-side surface of the tube body, such that every two of the adjacent locating elements define a locating slot therebetween to allow a fluid for defining the sleeper to flow through the locating slot and be held in the locating slot.

According to the embodiments of the present invention, the locating element is curvedly extended from one end of the casing tube to another end of the casing tube.

According to the embodiments of the present invention, the tube body is made of fiberglass and resin mixed with each other.

In accordance with another aspect of the invention, the present invention comprises a casing tube which is made by a fiberglass reinforced resin composite material, comprising:

at least one fiberglass selected from the group consisting of alkali-free fiberglass, medium-alkali fiberglass and the combination thereof; and at least one resin selected from the group consisting of o-phthalate unsaturated polyester resins, m-phthalate unsaturated polyester resins, bisphenol-A type unsaturated polyester resin, terephthalic unsaturated polyester resin, vinyl ester resin, epoxy resin, phenolic resin bisphenol-a type epoxy resin, bisphenol F epoxy resin, polyphenol glycidyl ether epoxy resin, aliphatic glycidyl ether epoxy resin, diglycidyl ester type resins, glycidylamine type epoxy resin, epoxidations of alkenes compounds, heterocyclic epoxy resin, mixed epoxy resin and the combination thereof, wherein the content of the resin is 30%-40%, wherein the content of the fiberglass is 60%-70%, wherein the fiberglass and the resin are mixed and heated to composite the fiberglass and the resin so as to form the fiberglass reinforced resin composite material.

According to the embodiments of the present invention, the content of the fiberglass is 67%, and the content of the resin is 33%.

In accordance with another aspect of the invention, the present invention comprises a method for manufacturing a casing tube, comprising the steps of:

(a) mixing the fiberglass and the resin to get a mixture of the fiberglass and the resin;

(b) pressing the mixture to composite and mold the mixture to obtain a tube body, wherein the tube body has at least a retaining element; and (c) coupling at least two the tube bodies with each other to define a screw channel therebetween, wherein the retaining element is located in the screw channel to define the casing tube.

According to the embodiments of the present invention, the method further comprising a step of:

(d) proving at least a fastening unit on the outer surface of the casing tube to fasten the tube bodies.

According to the embodiments of the present invention, the method further comprising a step of:

(e) providing a binding layer between the neighboring tube bodies for connecting the tube bodies with each other.

According to the embodiments of the present invention, in the step (d), binding the mixture having a strip shape on the outer surface of the casing tube so as to make the mixture form the fastening unit.

According to the embodiments of the present invention, in the step (b), each of the tube bodies defines at least one locating element on the outer surface thereof.

According to the embodiments of the present invention, in the step (b), overlapping the mixture made of long fiberglass and resin and the mixture of short fiberglass and resin with each other to make the mixture of long fiberglass and resin define the locating element and make the mixture of short fiberglass and resin define the retaining element.

According to the embodiments of the present invention, in the step (d), soaking the fiberglass in the resin to permeate the resin into the gaps of the fiberglass bunch, so as to form the fastening unit.

According to the embodiments of the present invention, in the step (d), making the resin flow through the fiberglass bunch to permeate the resin into the gaps of fiberglass bunch to form the fastening unit.

In accordance with another aspect of the invention, the present invention comprises a method for manufacturing a casing tube by a fiberglass reinforced resin composite material, comprising the steps of:

(1) preparing the fiberglass reinforced resin composite material;

(2) making the fiberglass reinforced resin composite material be in a sol state; and (3) gelling the fiberglass reinforced resin composite material via the casing tube module and demolding to obtain the casing tube, wherein the casing tube has a screw channel and a thread portion provided in the screw channel.

According to the embodiments of the present invention, before the step (1), the method further comprising the steps of:

(1.1) mixing the fiberglass and resin to obtain a mixture of the fiberglass and resin; and (1.2) heating and/or pressing the mixture of the fiberglass and resin to composite the fiberglass and resin and form the fiberglass reinforced resin composite material in sol state.

According to the embodiments of the present invention, the step (1.2) further comprises the steps of:

(1.2.1) forming the fiberglass reinforced resin composite material in sol state by long fiberglass reinforced resin;

(1.2.2) forming the fiberglass reinforced resin composite material in sol state by short fiberglass reinforced resin; and (1.2.3) overlapping the two fiberglass reinforced resin composite materials in the step (1.2.1) and the step (1.2.2).

According to the embodiments of the present invention, the fiberglass reinforced resin composite material further comprises:

at least one resin selected from the group consisting of o-phthalate unsaturated polyester resins, m-phthalate unsaturated polyester resins, bisphenol-A type unsaturated polyester resin, terephthalic unsaturated polyester resin, vinyl ester resin, epoxy resin, phenolic resin bisphenol-a type epoxy resin, bisphenol F epoxy resin, polyphenol glycidyl ether epoxy resin, aliphatic glycidyl ether epoxy resin, diglycidyl ester type resins, glycidylamine type epoxy resin, epoxidations of alkenes compounds, heterocyclic epoxy resin, mixed epoxy resin and the combination thereof, wherein the content of the resin is 30%-40%, wherein the content of the fiberglass is 60%-70%, wherein the fiberglass and the resin are mixed and heated to composite the fiberglass and the resin so as to form the fiberglass reinforced resin composite material.

In accordance with another aspect of the invention, the present invention comprises a method for manufacturing a casing tube, comprising the steps of:

(I) providing at least two tube bodies, wherein each of the tube bodies has a curved inner-side surface and at least a retaining element provided on the inner-side surface; and (II) coupling the tube bodies with each other to define a screw channel between the inner-side surfaces of the tube bodies to obtain the casing tube, wherein each of the retaining elements is provided in the screw channel.

According to the embodiments of the present invention, the method further comprises a step of:

(III) binding at least one fastening unit on the casing tube, wherein the fastening unit is provided for fastening each of the tube bodies.

According to the embodiments of the present invention, the step (III) further comprises a step of soaking the fiberglass in the resin to permeate the resin into the gaps of the fiberglass bunch, so as to form the fastening unit According to the embodiments of the present invention, the step (III) further comprises a step of making the resin flow through the fiberglass bunch to permeate the resin into the gaps of fiberglass bunch to form the fastening unit.

In accordance with another aspect of the invention, the present invention comprises a method for manufacturing a casing tube, comprising the steps of:

(A) preparing a billet for the tube body, wherein the size of the billet is no less than the size of tube body;

(B) cutting the billet to obtain the tube body, wherein the tube body has a curved inner-side surface and at least one retaining element provided on the inner-side surface; and (C) coupling at least two tube bodies to define a screw channel between the inner-side surfaces of the tube bodies to obtain the casing tube, wherein each of the retaining elements is provided in the screw channel.

According to the embodiments of the present invention, the step (A) further comprises the steps of:

(A.1) putting the unmolded material in the mould for the billet of the tube body; and (A.2) heating and/or pressing the unmolded material via the mould for the billet of the tube body to obtain the billet.

According to the embodiments of the present invention, the method further comprising a step of:

(D) binding at least one fastening unit on the tube body, wherein the fastening unit is adapted for fastening each of the tube bodies.

According to the embodiments of the present invention, the method further comprising a step of:

(E) arranging a binding layer between the neighboring tube bodies for connecting the neighboring tube bodies with each other.

In accordance with another aspect of the invention, the present invention comprises a method for manufacturing a casing tube, comprising the steps of:

Step 1: preparing a mixture of fiberglass and resin, wherein the mixture has a strip shape;

Step 2: binding the mixture on a mould core to obtain a billet for the casing tube;

Step 3: mould pressing the billet to fasten and mold the billet; and

Step 4: demolding, and removing the mould core to obtain the casing tube.

According to the embodiments of the present invention, the step 1 further comprises the steps of:

Step 1.1: mixing the fiberglass and the resin to prepare the mixture; and

Step 1.2: bunching the mixture to make the mixture have a bunch shape.

According to the embodiments of the present invention, the Step 1 further comprises the steps of:

Step 1.3: making the fiberglass have a bunch shape; and

Step 1.4: making the resin permeate into the gaps of the fiberglass to form the mixture having a strip shape.

According to the embodiments of the present invention, wherein the step 1.4 further comprises the steps of:

Step 1.4.1: soaking the fiberglass in the resin; and

Step 1.4.2: making the resin permeate into the gaps of the fiberglass bunches.

According to the embodiments of the present invention, the Step 1.4 further comprises the steps of:

Step 1.4.1: making the resin flow through the fiberglass having a bunch shape; and Step 1.4.2: making the resin permeate into the gaps of the fiberglass bunch.

According to the embodiments of the present invention, the step 2 further comprises a step of:

rotating the strip-shaped mixture of fiberglass and resin around the mould core to bind the mixture on the mould core.

According to the embodiments of the present invention, the step 2 further comprises a step of:

driving the mould core to rotate to bind the mixture of fiberglass and resin on the mould core.

According to the embodiments of the present invention, the method further comprises the following step before the step 2:

coating a releasing agent layer on the mould core.

According to the embodiments of the present invention, a distal end of the mould core has a size smaller than a near-end thereof.

According to the embodiments of the present invention, a distal end of the mould core has a size smaller than a near-end thereof.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 20 is a block diagram illustrating the manufacturing process of the casing tube according to above preferred embodiments of the present invention.

FIG. 21 is a block diagram illustrating the manufacturing method of the casing tube according to above preferred embodiments of the present invention.

FIG. 22 is a block diagram illustrating a first alternative mode of the manufacturing method of the casing tube according to above preferred embodiments of the present invention.

FIG. 23 is a block diagram illustrating a second alternative mode of the manufacturing method of the casing tube according to above preferred embodiments of the present invention.

FIG. 24 is a block diagram illustrating a third alternative mode of the manufacturing method of the casing tube according to above preferred embodiments of the present invention.

DETAILED DESCRIPTION OF THE PREFERRED EMBODIMENT

Figure 1:
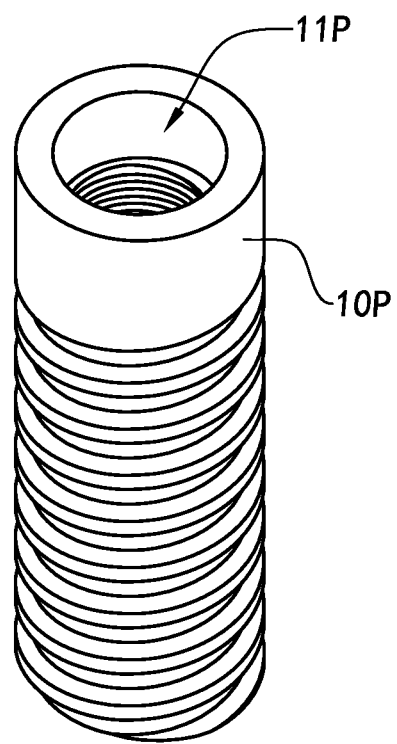
FIG. 1 is a perspective view of traditional pre-embedded casing tube.
Figure 2:
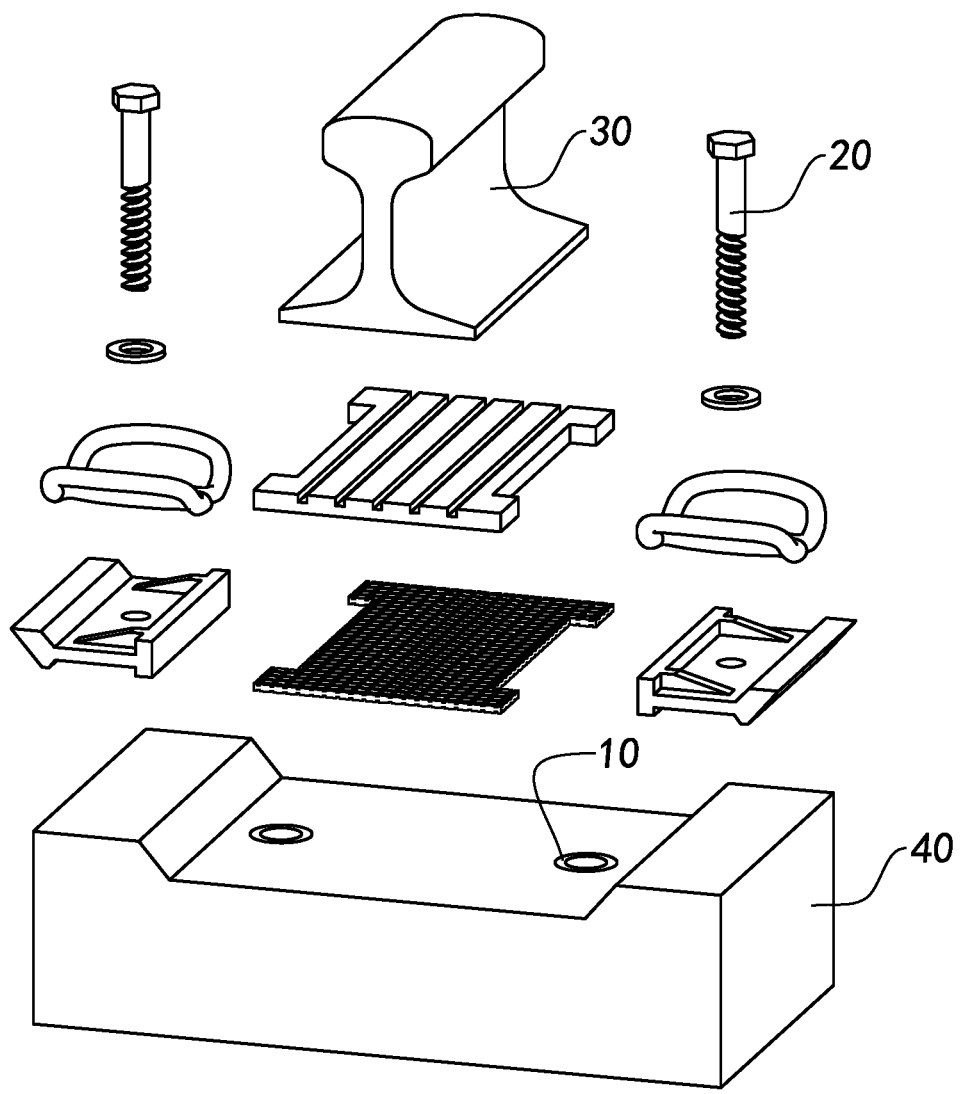
FIG. 2 is an exploded perspective view of a casing tube used in a railroad according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

As shown in FIG. 2 to FIG. 10, a casing tube 10 according to a preferred embodiment of the present invention is disclosed and described in detail as following, wherein the casing tube 10 as a pre-buried casing tube is applied in railway transformation system, to fasten a rail 30 on a sleeper 40 by a screw 20 for the rail 30 maintaining a stable structural connection with the sleeper 40.

Specifically, in the preferred embodiment of the present invention, each of the casing tubes 10 can be pre-embedded in the sleeper 40. Therefore, after the rail 30 is provided on the surface of the sleeper 40, the screw 20 can lock the rail 30 to the sleeper 40 from up to bottom.

More specifically, the casing tube 10 comprises at least two tube bodies 11 each having an arc-shape, preferably identical with each other, wherein each of the tube bodies 11 has an inner-side surface 130 and an outer-side surface 140 corresponding to the inner-side surface 130. The tube body 11 has at least one retaining element 111 integrally formed on the inner-side surface 130. As the tube bodies 11 are fittingly coupled with each other to form the casing tube 10, the inner-side surfaces 130 of the tube bodies 11 form a screw channel 12 as a passage for holding and engaging with the screw 20. And the retaining elements 111 of the tube bodies 11 are correspondingly matched with each other to form a thread portion 121 for the screw 20 screwing thereat.

Figure 3:
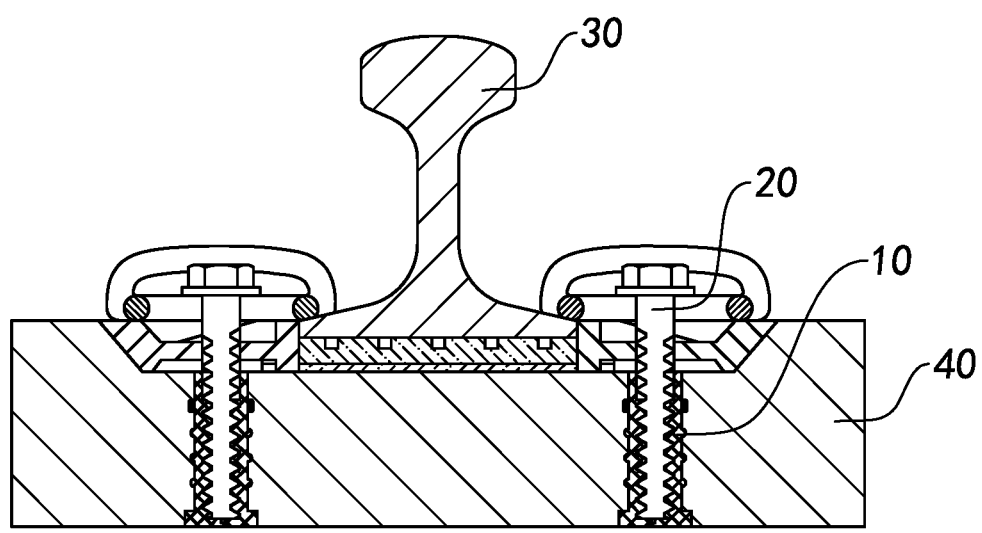
FIG. 3 is a sectional view of the casing tube used in the railroad according to a preferred embodiment of the present invention.
Figure 4:
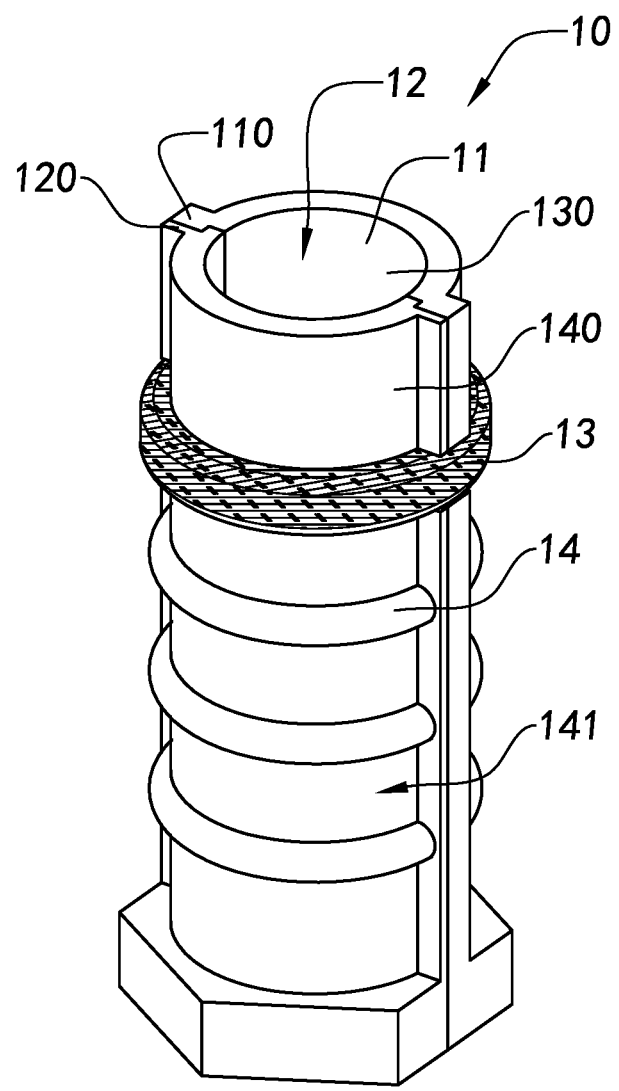
FIG. 4 is a perspective view of the casing tube according to a preferred embodiment of the present invention.
Figure 5:
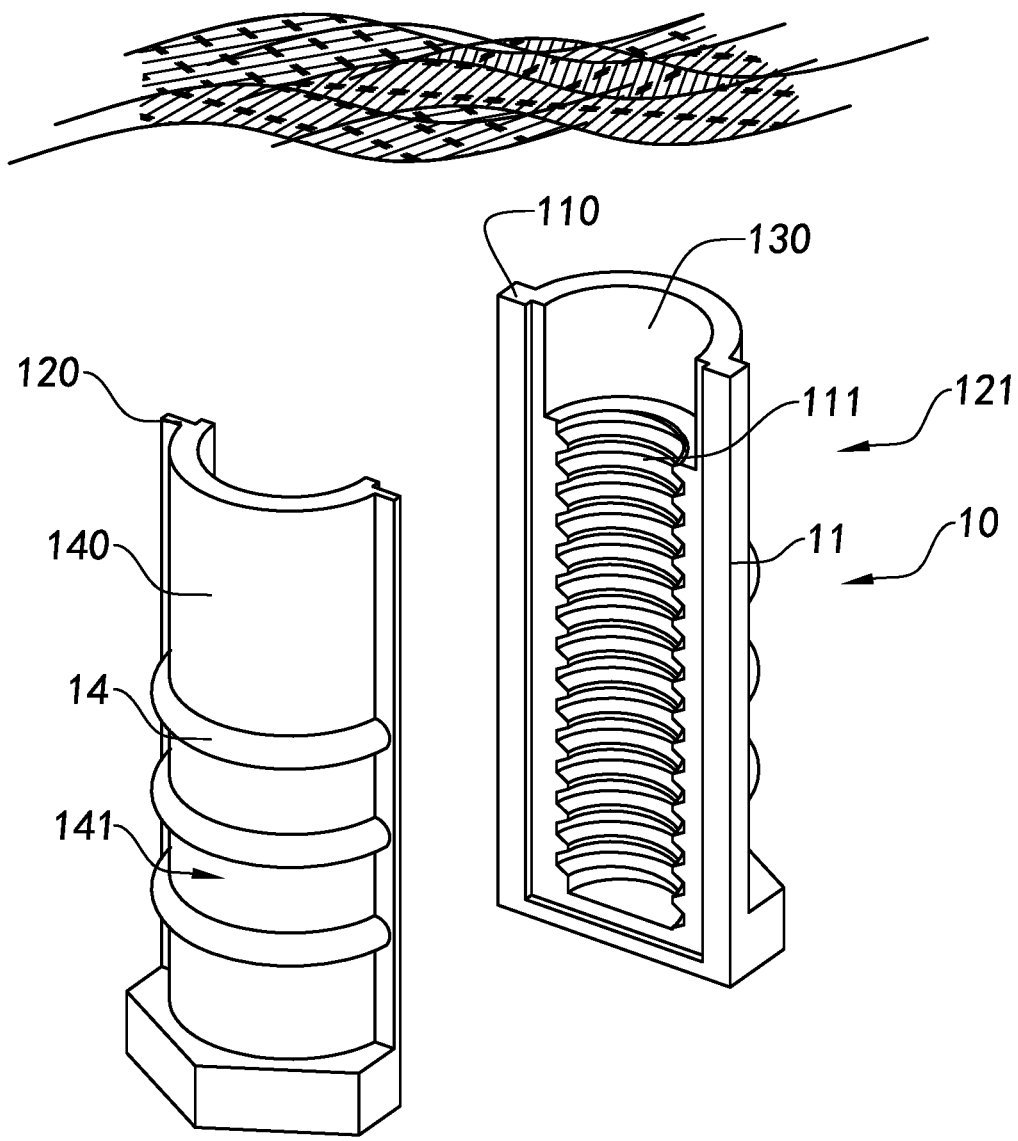
FIG. 5 is an exploded perspective view of the casing tube according to a preferred embodiment of the present invention.
Figure 6:
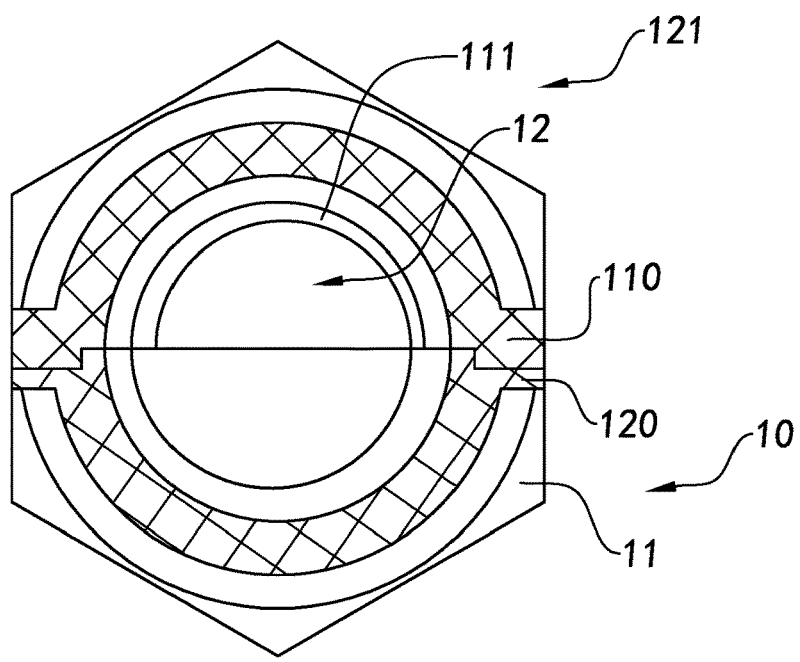
FIG. 6 is a sectional view of the casing tube according to the preferred embodiment of the present invention.

As in FIG. 3 of the preferred embodiment of the present invention, the casing tube 10 has two tube bodies 11. Especially, the two tube bodies 11 can be overlappedly coupled with each other edge-to-edge that the inner-side surface 130 of the two tube bodies 11 form the screw channel 12 and the thread portion 121 by the retaining elements 111. The casing tube 10 further comprises one or more fastening units 13, wherein when each of the tube bodies 11 fittingly coupled with each other, the fastening units 13 are spacedly and coaxially encircled around the outer surface of the casing tube 10 so as to fasten the tube bodies 11 together. So, the screw 20 is not only effectively sealed the gap of contact between the tube bodies 11, but also prevented mis-displacement of the tube bodies 11 under stress by each of the fastening unit 13 when the casing tube 10 bears a transverse impact force to ensure stability of structure of the casing tube 10. It is understandable for one skilled in the art, the sleeper 40 is usually made of material like the ferroconcrete in which the fluidity thereof is high before solidification. As the casing tube 10 is provided at the preset position, and the sleeper 40 is molded by a molding process, the flow of material made the sleeper 40 will generate transverse impact force to the casing tube 10 to make the one of tube bodies 11 tend to be mis-displaced. Then each of the fastening unit 13 prevents the tube body 11 to be mis-displacement. Therefore, the material made the sleeper 40 will not be permeated into the screw channel 12 through the gap of contact between the neighboring tube bodies 11. Also the thread portion 121 inside the screw channel 12 formed by the casing tube 10 will not be malpositioned.

The outer-side surface 140 of each of the tube bodies 11 of the casing tube 10 has at least one locating element 14 formed in an annular shape. In other words, each of the locating elements 14 is integrally and coaxially protruded from the outer-side surface 140 of the tube body 11, so that after the casing tube 10 is fastened on the sleeper 40, each of the locating elements 14, which serves as a reinforcing rim, is enforced the meshing force between the outer surface of the casing tube 10 with the sleeper 40. Specifically, every two of the adjacent locating elements 14 form a locating slot 141 therebetween, wherein as the casing tube 10 is fastened at the preset position of the sleeper 40, the material made the sleeper 40 will flow to permeate in the locating slot 141 between the adjacent locating elements 14. Therefore, after the sleeper 40 is molded, the sleeper 40 is meshed with the outer surface of casing tube 10. In this way, each of the locating elements 14 is enforced the meshing force between the outer surface of the casing tube 10 with the sleeper 40 to make the connection between the casing tube 10 and the sleeper 40 more stable.

Comparing with the thread structure of traditional pre-embedded casing tube 10P (in FIG. 1), because each of the locating elements 14 of the present invention is set along the outer surface of the casing tube 10 separately, after the sleeper 40 is molded, each of the locating elements 14 forms vertical force relationship with the sleeper 40. Specifically, when the vehicle runs on the rail 30, the vehicle generates sustained mechanical vibrations to the sleeper 40. This mechanical vibrations directly leads to make the casing tube 10 tend to move up and down against the sleeper 40. But because of each of the locating elements 14 and each of the locating slots 141 the casing tube 10 will not move against the sleeper 40. So, the casing tube 10 and the sleeper 40 have formed stable position relationship. The thread structure of traditional pre-embedded casing tube 10P has a set of thread portion. When the pre-embedded casing tube 10P bears sustained mechanical vibrations from the vehicle to the sleeper 40, the negative result is the pre-embedded casing tube 10P rotated positively or reversely which changes the relationship between the pre-embedded casing tube 10P and the sleeper 40 and results in decreasing durability.

Each of the tube bodies 11 has a first side portion 110 and a second side portion 120 extended radially, wherein the first side portion 110 and the second side portion 120 are extended from edges of each of the tube bodies 11 respectively. As each of the tube bodies 11 is provided fittingly to form the casing tube 10, the first side portion 110 and the second side portion 120 of the tube bodies 11 are overlapped coupled with each other. And the first side portion 110 and the second side portion 120 of the each tube body 11 can prevent each of the tube bodies 11 rotating against each other. It is worth mentioning that two ends of the locating element 14 are extended from the first side portions 110 of one tube body 11 and two ends of the locating elements 14 are extended from the second side portions 120 of another tube body 11.

Specifically, the first side portion 110 and the second side portion 120 of each of the tube bodies 11 are extended from the inner-side surface 130 to the outer-side surface 140 respectively, and the first side portion 110 and the second side portion 120 of the tube bodies 11 are protruded from the outer-side surfaces 140 of the tube bodies 11. In other words, the first side portion 110 has a slot and the second side portion 120 has a protrusion to engage with the slot when the first side portion 110 and the second side portion 120 are coupled with each other. In this way, the contact between the first side portion 110 and the second side portion 120 of the tube bodies 11 can be increased to reduce the gap between the first side portion 110 and the second side portion 120 of the tube bodies 11 for ensuring the sealing between the tube bodies 11 of the casing tube 10.

Figure 7:
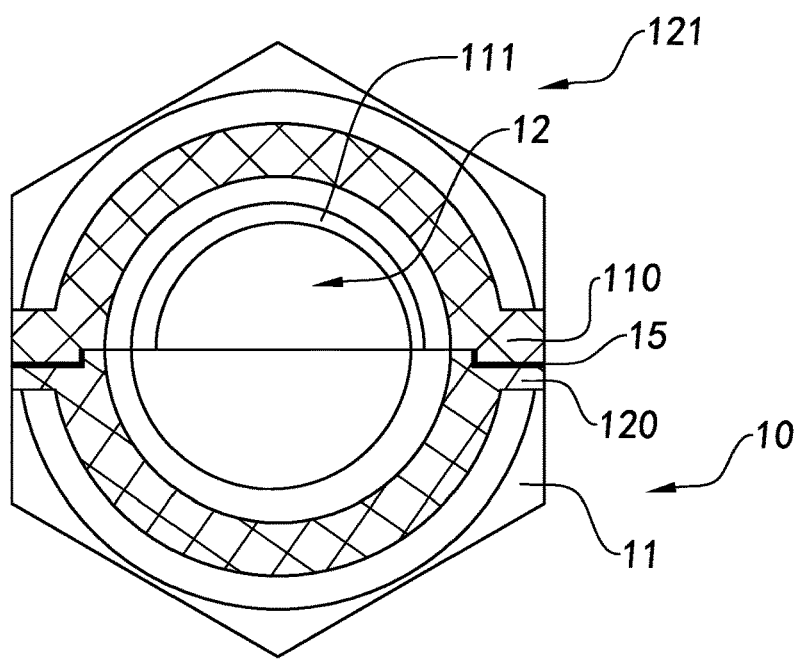
FIG. 7 is a sectional view of the casing tube according to the preferred embodiment of the present invention, illustrating the binding layer.

FIG. 7 illustrates an alternative mode of the preferred embodiment above according to the present invention, wherein the casing tube 10 further comprises at least one binding layer 15 sandwiched between the first side portion 110 and the second side portion 120 of the tube bodies 11 when the tube bodies 11 are coupled with each other. And the binding layer 15 can further seal the gap between the first side portion 110 and the second side portion 120 of the tube bodies 11. Thus the sealing between the first side portion 110 and the second side portion 120 of the casing tube 10 will be better.

Figure 8:
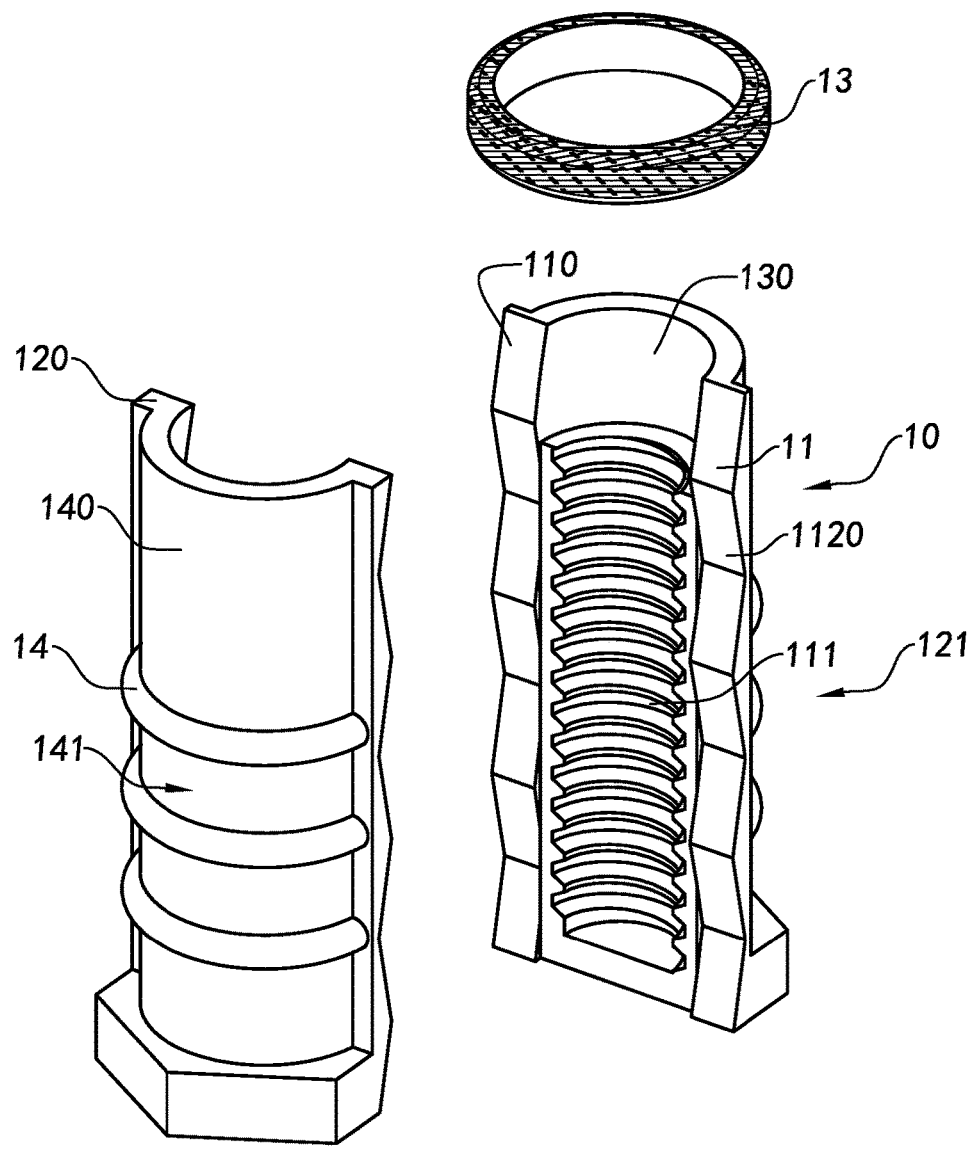
FIG. 8 illustrates an alternative mode of the casing tube according to the preferred embodiment of the present invention.
Figure 9:
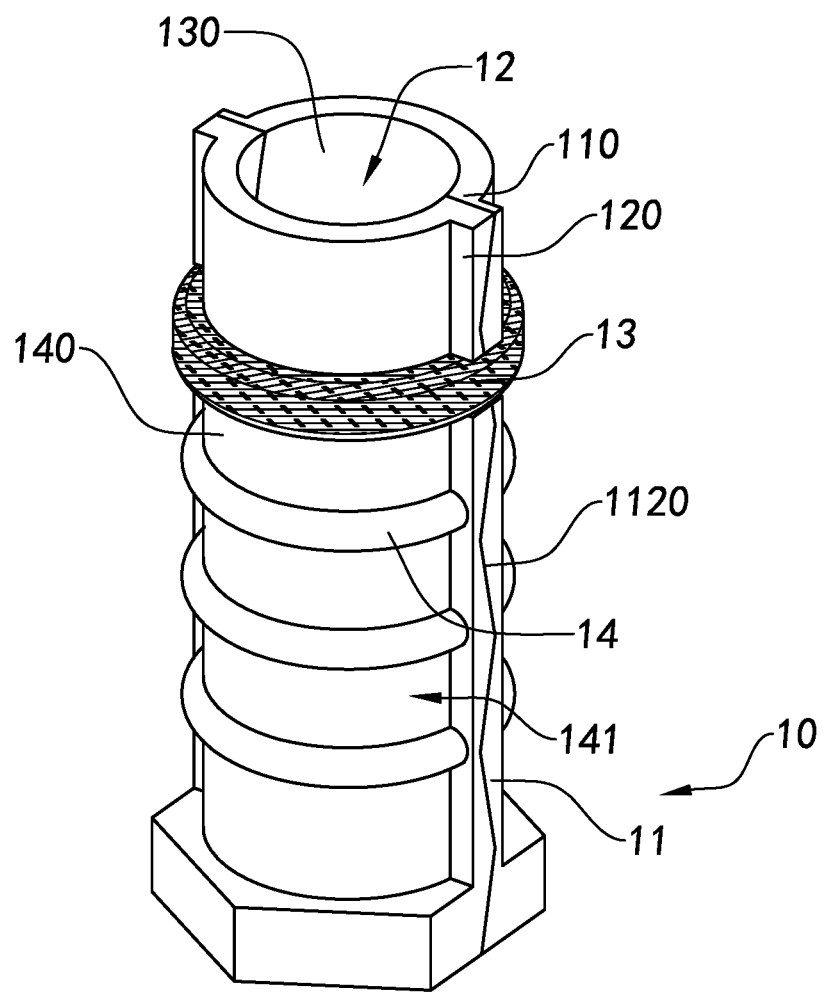
FIG. 9 is a perspective view illustrating the alternative mode of the casing tube according to the preferred embodiment of the present invention.

FIG. 8 and FIG. 9 illustrate another alternative mode of the preferred embodiment above according to the present invention, the first side portion 110 and the second side portion 120 of the tube bodies 11 have a plurality of locating teeth 1120 respectively. As the first side portion 110 and the second side portion 120 of the tube bodies 11 are coupled with each other, the locating teeth 1120 are meshed with each other to prevent the vertical movement between the tube bodies 11.

The fastening unit 13 is in strip shape for binding the fastening unit 13 around the casing tube 10 so as to fasten the tube bodies 11 together. It is worth mentioning that the fastening unit 13 is made by fiberglass strands soaked in resin.

Also, the fastening unit 13 can be configured to have a ring shaped element with a predetermined elasticity, such as an elastic ring. At the normal state of the fastening unit 13, which is not stretched by any force, the diameter of the fastening unit 13 is smaller than the diameter of the casing tube 10. So after the fastening unit 13 is encircled around the casing tube 10, the elastic binding force of the fastening unit 13 is applied to the casing tube 10 to fasten the tube bodies 11 together.

Before the use of the casing tube 10, the casing tube 10 is preset in the sleeper 40 when the sleeper 40 is molded during the molding process. As the rail 30 is provided on the preset position of the sleeper 40, the screw 20 is fastened from up to bottom, such that the thread portion 121 of the casing tube 10 and the screw 20 are fastened with other.

Figure 11A:
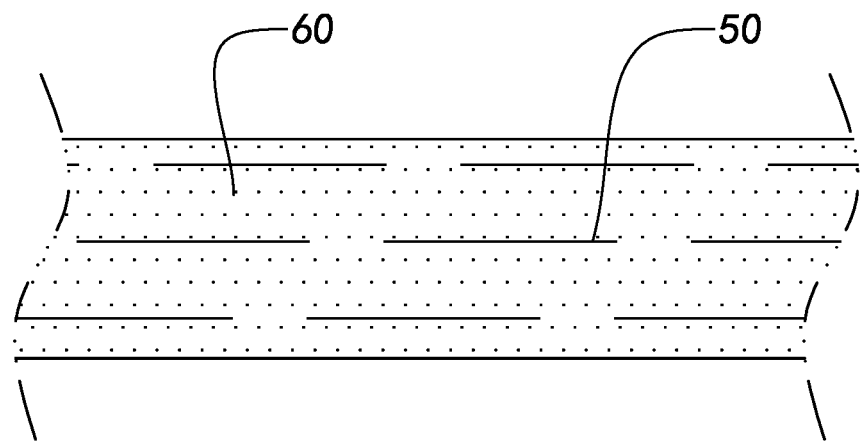
FIGS. 11A and 11B are diagrams illustrating the distribution of the fiberglass reinforced resin composite of the casing tube according to the preferred embodiment of the present invention.
Figure 11B:
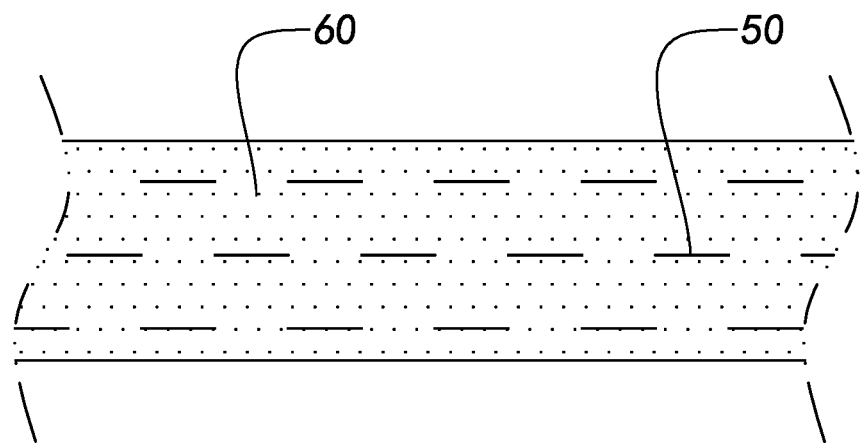
Figure 12:
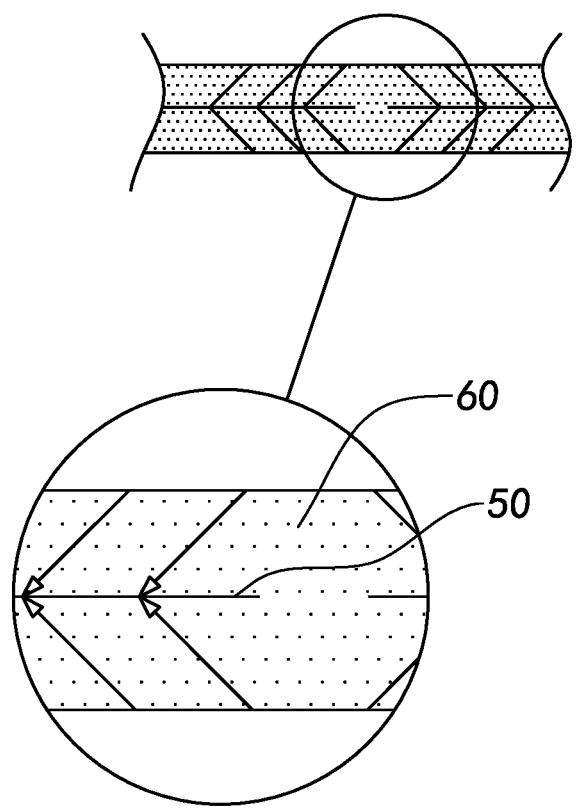
FIG. 12 is a force analysis diagram of the fiberglass reinforced resin composite of the casing tube according to the preferred embodiment of the present invention.

As in FIGS. 11A to 12, modifications, such as other characters of the fiberglass reinforced resin composite of the present invention, are set forth and disclosed in details as following.

Specifically, the fiberglass reinforced resin composite is constructed with at least one kind of fiberglass 50 and at least one kind of resin 60. The fiberglass 50 is selected from the group consisting of alkali-free fiberglass, medium-alkali fiberglass and the combination thereof. The resin 60 is selected from the group consisting of o-phthalate unsaturated polyester resins, m-phthalate unsaturated polyester resins, bisphenol-A type unsaturated polyester resin, terephthalic unsaturated polyester resin, vinyl ester resin, epoxy resin, phenolic resin bisphenol-a type epoxy resin, bisphenol F epoxy resin, polyphenol glycidyl ether epoxy resin, aliphatic glycidyl ether epoxy resin, diglycidyl ester type resins, glycidylamine type epoxy resin, epoxidations of alkenes compounds, heterocyclic epoxy resin, mixed epoxy resin and the combination thereof. The content of the resin 60 is 30%-40% by weight, and the content of the fiberglass 50 is 60%-70% by weight. The fiberglass 50 and the resin 60 are composited by heating the mixture of the fiberglass 50 and the resin 60, then, forming the fiberglass reinforced resin composite. To be clear, when using the fiberglass 50 to modify the resin 60, the molecules of the fiberglass 50 and the resin 60 forms reticulate cubic structure to enforce the consistency and concordance of internal structure of the fiberglass reinforced resin composite. Thus, the casing tube 10 has strength and rigidity of the fiberglass 50, and lightweight and tenacity of the resin 60, also, stability and durability for the casing tube 10 made by the fiberglass reinforced resin composite.

Preferably, the content of the fiberglass 50 is 67% by weight, and the content of the resin 60 is 33% by weight.

The principle of the fiberglass reinforced resin composite made the casing tube 10 is composited between the fiberglass 50 and the resin 60. In details, the high strength of the fiberglass 50 can bear sustainable and frequent impact from trains to the rail which has negative effects to the casing tube 10. The negative effects to the casing tube 10 are eliminated by the plastic flow of the resin 60 and the cohesiveness between the fiberglass 50 and the resin 60.

Furthermore, in longtime using of the casing tube 10, if the negative effects of sustainable and frequent impact from trains to the rails cannot be overcome, inside the casing tube 10, the fiberglass 50 is the first to fracture. It can be understood that, without the fiberglass 50 or near the fracture portion of the fiberglass 50, the resin 60 is not going to bear the negative effect. But as the fracture portion of the fiberglass 50 is blocked by the plastic flow of the resin 60 adhered to the fracture portion of fiberglass 50, the fiberglass 50 tend to fracture continually is stopped. Thus, somewhere far away from the fracture portion of fiberglass 50 still has enough strength to bear the negative effect.

As the compound characters of the fiberglass 50 and the resin 60 described above, in using the fiberglass 50 reinforcing the resin 60, the plentiful shorter fiberglass 50 can be instead of longer fiberglass 50 so as to mix the fiberglass 50 with the resin 60 easily and reduce the cost and difficulty to manufacture.

It is worth mentioning that another advantage that made the casing tube 10 in the fiberglass reinforced resin composite is the fiberglass reinforced resin composite has excellent insulation ability. Even in the extreme environment, like the humid environment, for long the insulation ability of the casing tube 10 is hard to be effected. So, the continuity of the signal transmission of the railway transportation system can be guaranteed effectively to ensure security of transportation.

Figure 10:
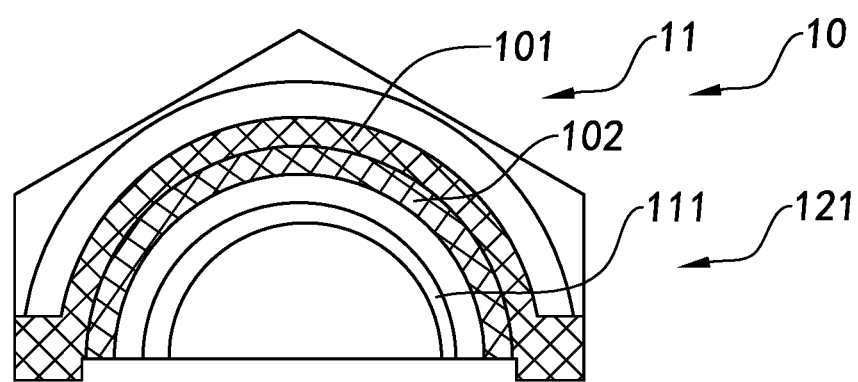
FIG. 10 is a sectional view of each tube body of the casing tube according to the preferred embodiment of the present invention.

As in FIG. 10, for ensuring the strength of the thread portion 121 of the casing tube 10, each of the tube bodies 11 comprises a first body 101 and a second body 102, wherein the first body 101 is overlapped with the second body 102 to cover the second body 102. The thread portion 121 is provided on the second body 102. The first body 101 is made of the fiberglass reinforced resin composite formed by long fiberglass and resin mixed with each other, wherein the second body 102 is made of the fiberglass reinforced resin composite formed by short fiberglass and resin mixed with each other.

Figure 13:
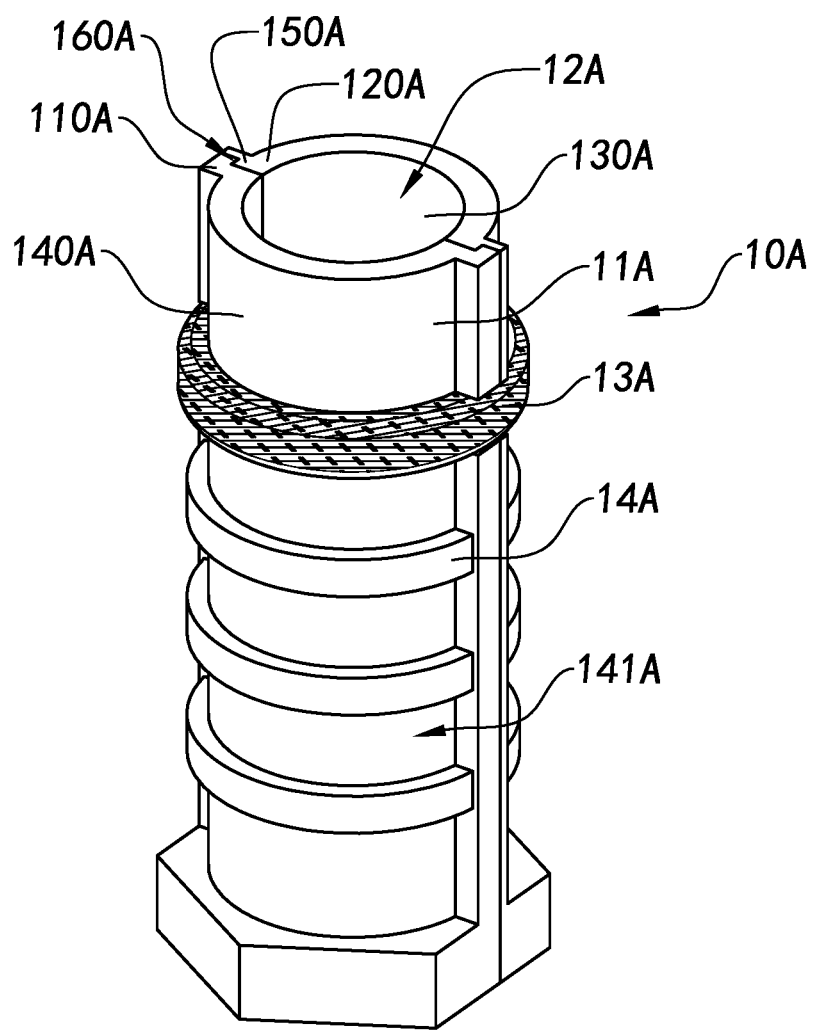
FIG. 13 is a perspective view of a casing tube according to a second preferred embodiment of the present invention.
Figure 14:
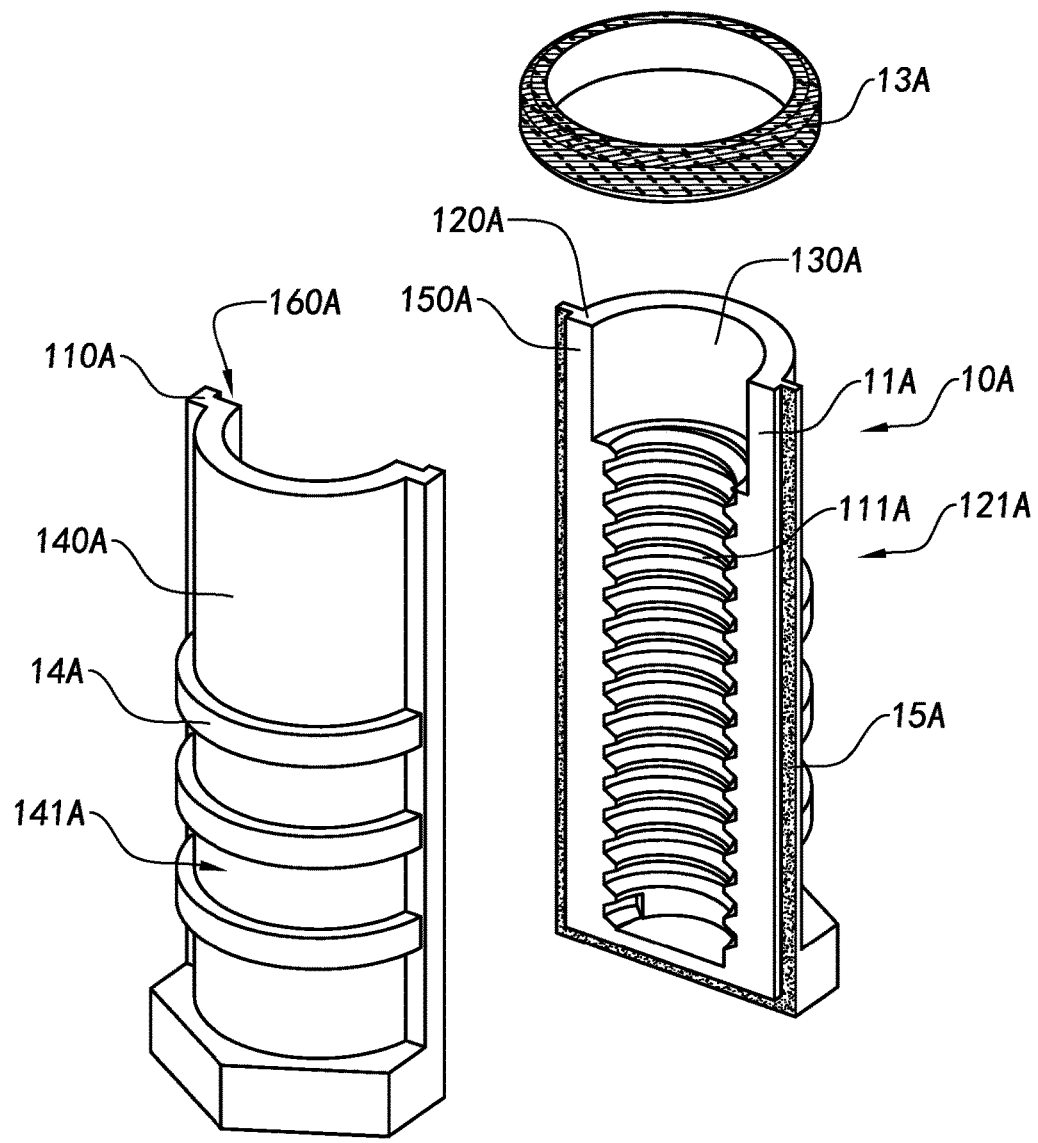
FIG. 14 is an exploded perspective view of the casing tube according to the second embodiment of the present invention.

Another preferred embodiment of the present invention is shown in FIG. 13 and FIG. 14. The casing tube 10A comprises at least two tube bodies 11A each having an arc-shape, wherein each of the tube bodies 11A has a first side portion 110A and a second side portion 120A, wherein the first side portion 110A and the second side portion 120A are extended radially and outwardly from the tube bodies 11A respectively.

Each of the tube bodies 11A further has an inner-side surface 130A and an outer-side surface 140A corresponding to the inner-side surface 130A, wherein each of the inner-side surface 130A and outer-side surface 140A are extended curvedly between the first side portion 110A and the second side portion 120A respectively to form the arc-shaped tube bodies 11A respectively.

Furthermore, the tube body 11A has at least one retaining element 111A integrally formed on the inner-side surface 130A. As the tube bodies 11A are fittingly coupled with each other edge-to-edge to form the casing tube 10A, the inner-side surfaces 130A of the tube bodies 11A form a screw channel 12A and each of the retaining elements 111A of each of the tube bodies 11A is correspondingly matched with each other to form a thread portion 121A for the screw 20A screwing thereat. It is worth mentioning that the thread portion 121A is designed according to the screw to be used actually. For example, sizes, clearance and so on of the thread portion 121A are adjustable as required.

The casing tube 10A, in this preferred embodiment of the present invention, is constructed to have two tube bodies 11A, wherein the two tube bodies 11A are overlappedly coupled with each other edge-to-edge to form the screw channel 12A between the inner-side surfaces 130A of the tube bodies 11A. One skilled in art will understand that in other embodiment of the present invention the casing tube 10A can comprises more than two tube bodies 11A.

In addition, the casing tube 10A further comprises at least one fastening unit 13A for fastening the tube body 11A. And as the casing tube 10A is being used each of the fastening unit 13A prevents relative movement of the casing tube 10A so as to ensure the reliability of the casing tube 10A. For the casing tube 10A of the present invention, each of the fastening units 13A is encircled around the casing tube 10A to fasten the tube bodies 11 together. In details, the method for manufacturing the casing tube 10A comprises steps as following.

Step A: Couple the tube bodies 11A together, wherein the first side portion 110A and the second side portion 120A of the tube bodes 11A are coupled with each other, and the inner-side surfaces 130A of the tube bodies 11A form the screw channel 12A.

Step B: Bind each of the fastening units 13A around the outer-side surfaces 140A of the tube bodies 11A for fastening the tube bodies 11A together to form the casing tube 10A.

In other words, the casing tube 10A in the present invention, each of the tube bodies 11A is fastened by binding the fastening unit 13A. Thus, as one of the tube bodies 11A is forced to tend to move relatively, the fastening unit 13A provides a binding force to stop relative movement between the tube bodies 11A to ensure the reliably of the casing tube 10A in application. In this way, during the molding process of the sleeper, the casing tube 10A can be pre-embedded in position. And during the flow of mold material for forming the sleeper, because each of the tube bodies 11A is fastened by the fastening unit 13A, the impact of flow of mold material for forming the sleeper to each of the tube bodies 11A will not cause each of the tube bodies 11A of the casing tube 10A to move relatively so as to prevent the malposition of the tube body 11A. So, by ensuring the thread portion 121A formed by the retaining elements 111A of the tube bodies 11A without malposition, the quality of each of the casing tube 10A can be ensured.

Otherwise, the outer-side surface 140A of each of the tube bodies 11A has at least one locating element 14A formed in an annular shape. Each of the locating element 14A is integrally and coaxially protruded from the outer-side surface 140A of the tube body 11A so that every two of the adjacent locating element 14A form a locating slot 141A therebetween. As the casing tube 10A is fastened at the position of the sleeper 40A the material made the sleeper 40A will flow to fulfill in space of the locating slot 141A.

After the sleeper 40A is molded, the sleeper 40A is meshed with the casing tube 10 to prevent the tube bodies 11A moving reciprocatedly under vibrations which the locating element 14A will stop movement of the casing tube 10A for fastening the casing tube 10A on the preset position.

Figure 15:
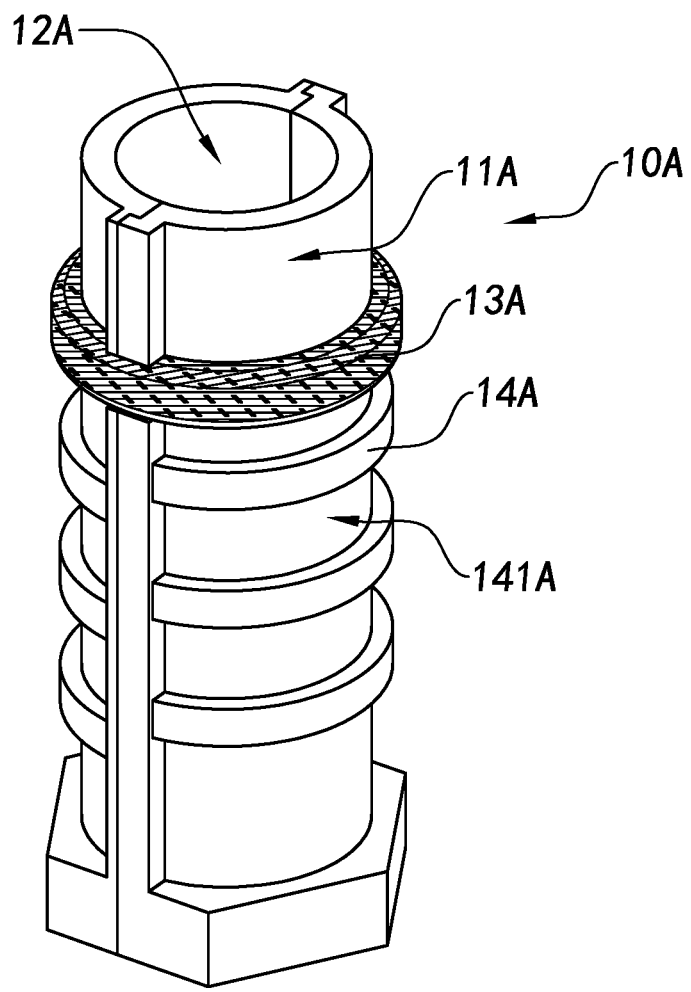
FIG. 15 illustrates an alternative mode of the casing tube according to the second embodiment of the present invention.

As shown in FIG. 13, in the casing tube 10A of the present invention, the locating elements 14A of the tube bodies 11A are corresponding positioned. In other words, after the tube bodies 11A formed the casing tube 10A, the locating elements 14A of the tube bodies 11A are aligned with each other end-to-end and are encircled around the outer wall of the casing tube 10A. As the casing tube 10A of the preferred embodiment of the present invention in FIG. 15, the position of the locating elements 14A of the tube bodies 11A can be misaligned with each other. After the tube bodies 11A formed the casing tube 10A, the locating elements 14A of the tube bodies 11A is staggered around the outer wall of the casing tube 10A. In other words, the locating elements 14A at the tube bodies 11A are alternating with each other. In these kinds of aspects the invention is not restricted.

Further, the first side portion 110A and the second side portion 120A of the tube body 11A are extended form the inner-side surface 130A to the outer-side surface 140A of the tube body 11A, and the first side portion 110A and the second side portion 120A are protruded from the outer-side surface 140A of the tube body 11A. In other words, the thickness of the first side portion 110A and the second side portion 120A of the tube bodies 11A are larger than thickness of other portions, or the thickness between the inner-side surface 130A and the outer-side surface 140A is smaller than thickness of the first side portion 110A and the second side portion 120A of the tube body 11A. In this way, as the tube bodies 11A are provided fitly to form the casing tube 10A, the contact area of each of the tube bodies 11A can be increased so as to prevent malposition and rotation of each of the tube bodies 11A by the first side portion 110A and the second side portion 120A of the tube bodies 11A. Also, with increasing the contact area of each of the tube bodies 11A, the gap between the first side portion 110A and the second side portion 120A of the tube body 11A can be reduced effectively to ensure the sealing between the tube bodies 11A of the casing tube 10A. By this means, when the casing tube 10A is pre-embedded at the corresponding position of the sleeper, the flowing material for forming the sleeper will not pass through the gap between of the tube bodies 11A to permeate into the screw channel 12A.

In addition, in the casing tube 10A of the present invention, one of the tube bodies 11A has a holding member 150A protruded from at the first side portion 110A and the second side portion 120A as the protrusion, and a holding slot 160A indented from the first side portion 110A and the second side portion 120A as the protrusion as the slot. In other words, the holding member 150A is located at an outer edge of the first side portion 110A and the holding slot 160A is located at an inner edge of first side portion 110A of one tube body 11A. Correspondingly, the holding member 150A is located at an inner edge of the second side portion 120A and the holding slot 160A is located at an outer edge of second side portion 120A of another tube body 11A. As the tube bodies 11A are coupled with each other to form the casing tube 10A, the holding member 150A and the holding slot 160A of one tube body 11A are inter-engaged with the holding slot 160A and the holding member 150A of the another tube body 11A respectively. In this way, it is not only the malposition and the rotation of the tube bodies 11A can be stopped effectively, but the sealing between the tube bodies 11A for forming the casing tube 10A can be improved.

Also, the casing tube 10A further comprises a binding layer 15A which is between the first side portion 110A and the second side portion 120A of the tube bodies 11A. In other words, the binding layer 15A are sandwiched between the first side portion 110A and the second side portion 120A of the tube bodies 11A for adhering the first side portion 110A and the second side portion 120A of the tube bodies 11A together. And the binding layer 15A can help the sealing between the tube bodies 11A to form the casing tube 10A better.

Figure 16:
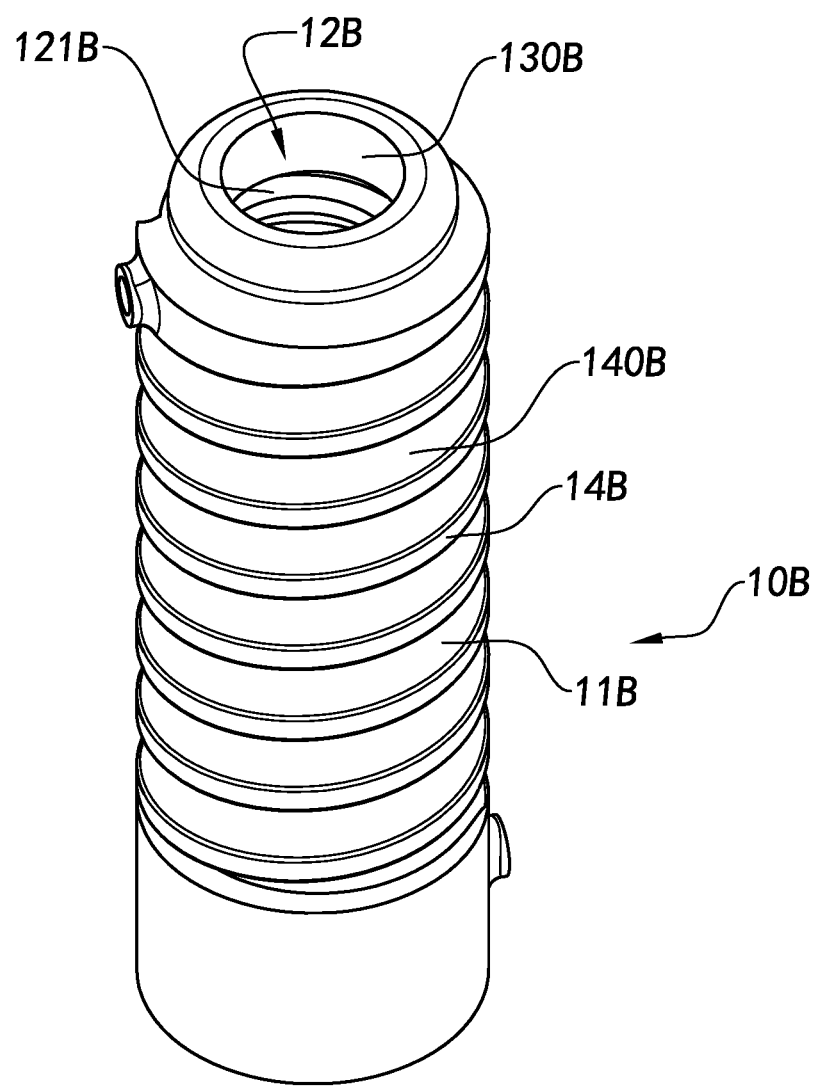
FIG. 16 a perspective view of a casing tube according to a third preferred embodiment of the present invention.
Figure 17:
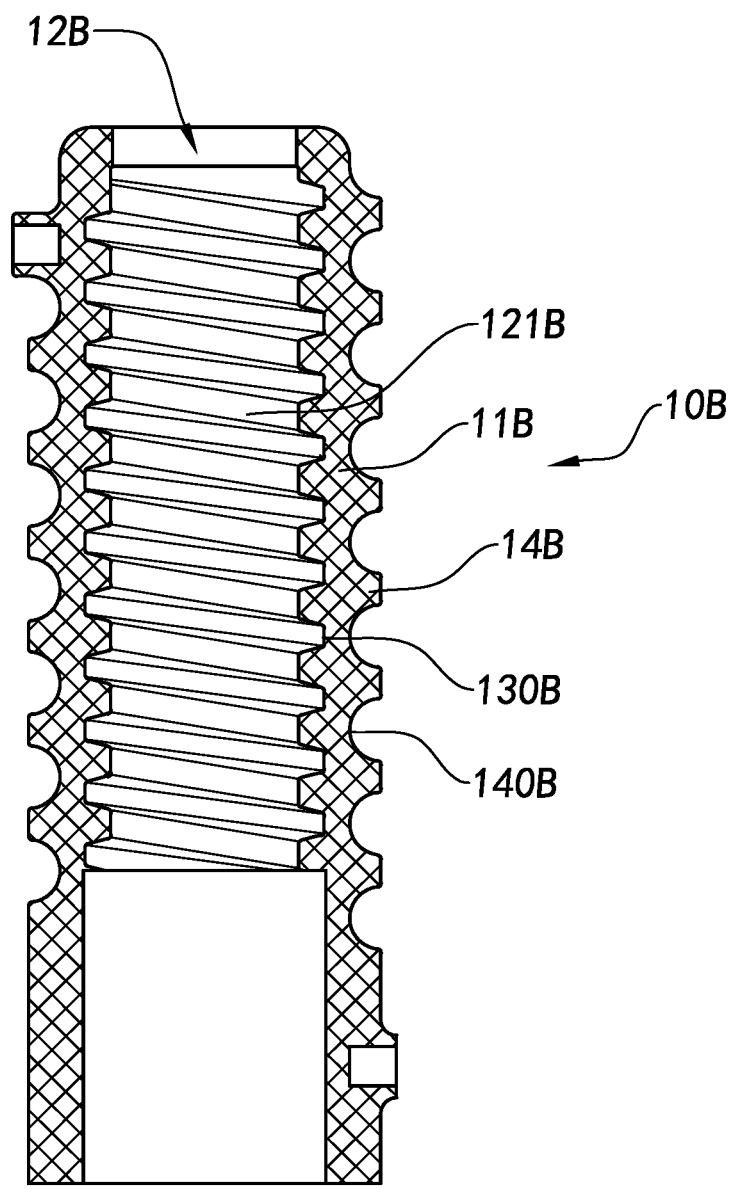
FIG. 17 is a sectional view of the casing tube according to the third preferred embodiment of the present invention.

As shown in FIG. 16 and FIG. 17, a casing tube 10B according to another preferred embodiment of the present invention is illustrated. The casing tube 10B has the similar structural configuration of the above preferred embodiment, expect the casing tube 10B having an integrated structure.

Specifically, the casing tube 10B comprises a tube body 11B, having a hollow structure, which has an inner-side surface 130B and an outer-side surface 140B corresponding to the inner-side surface 130B, wherein the inner-side surface 130B of the tube body 11B defines a screw channel 12B therewithin. The inner-side surface 130B of the tube body 11B has a thread portion 121B for meshing the screw inside the screw channel 12B.

In other words, in this preferred embodiment, the casing tube 10B comprises the only one tube body 11B. In this way, the reliability of the casing tube 10B pre-embedded in the sleeper can be improved.

The tube body 11B has at least one locating element 14B integrally protruded from the outer-side surface 140B thereof for ensuring the reliability of the casing tube 10B pre-embedded in the sleeper. As shown in FIG. 16, in this preferred embodiment of the present invention, the locating element 14B can be extended spirally from one end of the tube body 11B to the other end of the tube body 11B, such as from the top end to the bottom end. In other words, the locating element 14B can form in spiral structure. When the casing tube 10B is pre-embedded at corresponding position, the flowing material forming the sleeper will flow along spiral slot of spiral structure of the tube body 11B so as to fasten the casing tube 10B in the preset position.

Figure 18:
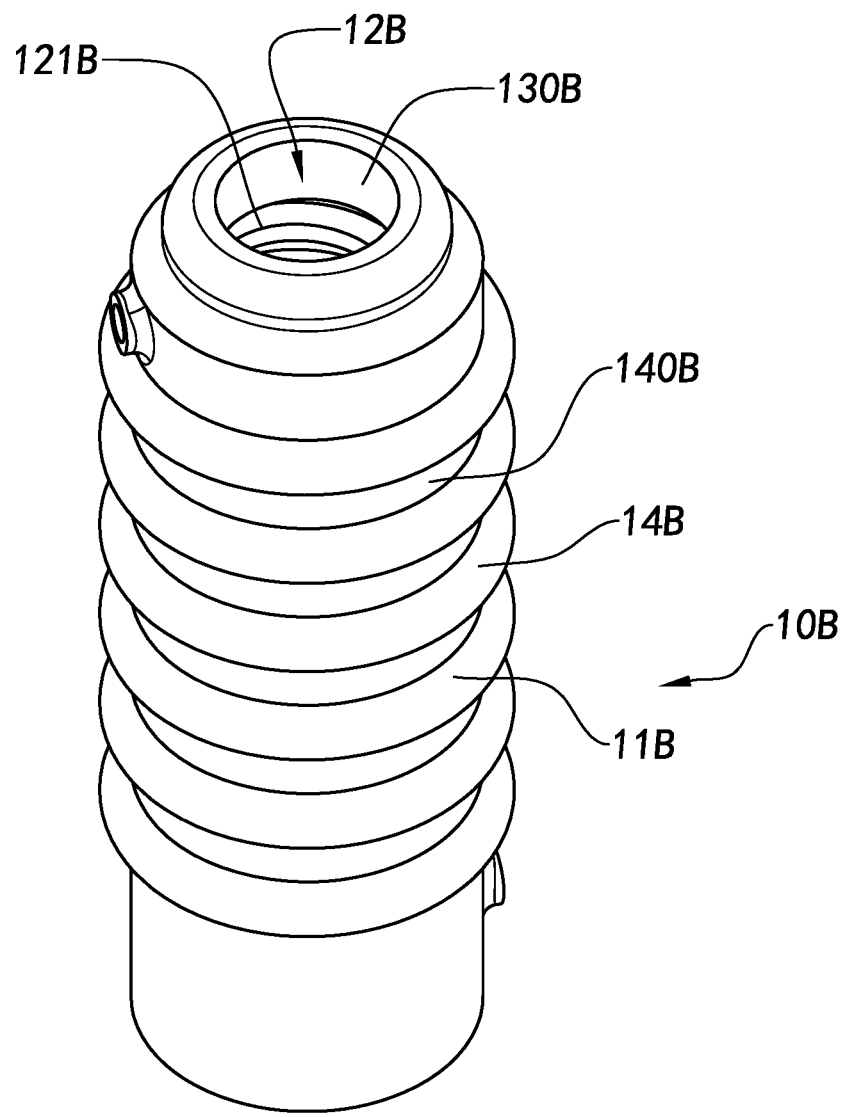
FIG. 18 illustrates an alternative mode of the casing tube according to the third preferred embodiment of the present invention.
Figure 19A:
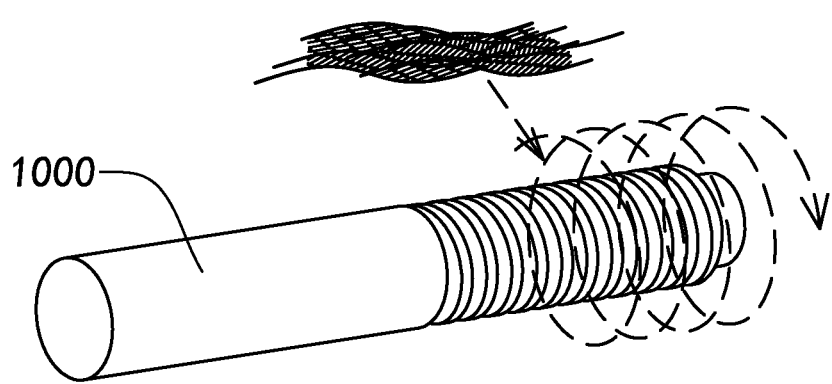
FIGS. 19A to 19E are manufacturing process diagrams of the casing tube according to above preferred embodiments of the present invention.
Figure 19B:
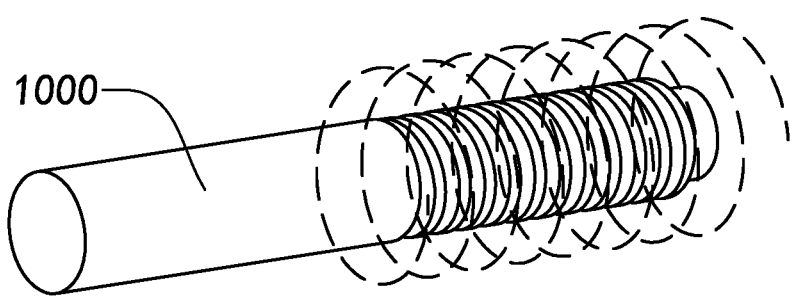
Figure 19C:
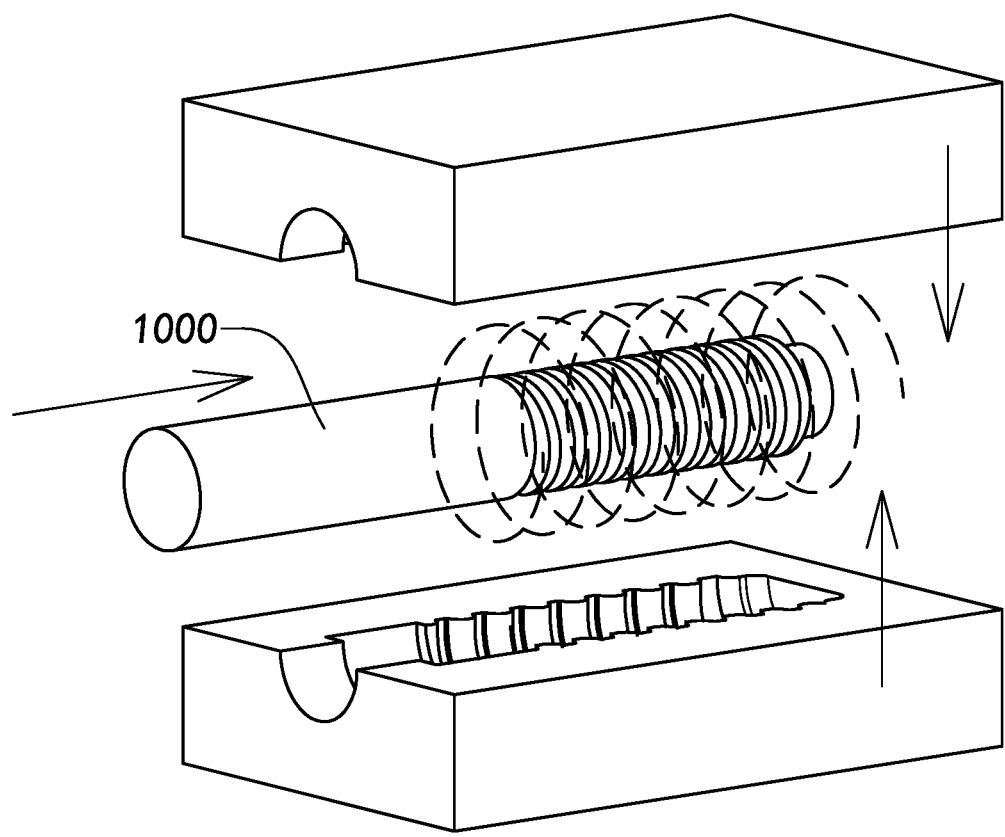
Figure 19D:
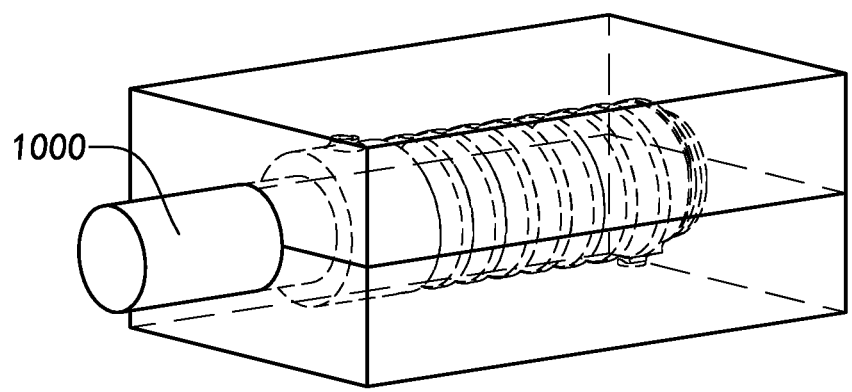
Figure 19E:
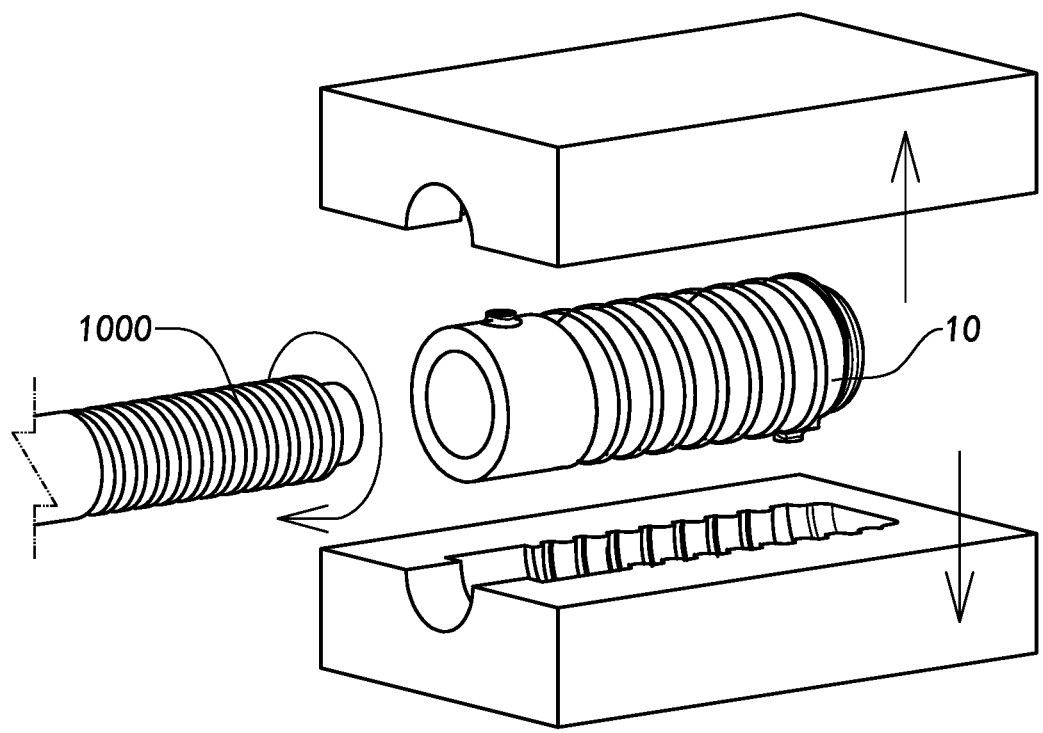

FIG. 18 illustrates an alternative mode of the locating elements 14B which are spacedly provided on the outer-side surface 140B of the tube body 11B to form a locating slot 141B between every two of the adjacent locating elements 14B. As the casing tube 10B is pre-embedded in the corresponding position of the sleeper, the material made the sleeper will flow to fulfill in space of the locating slot 141B. Thus, after the sleeper is molded, the casing tube 10B is meshed with the sleeper to prevent the casing tube 10B trends to move reciprocatedly under vibrations which each of the locating elements 14A will stop movement of the casing tube 10B for fastening the casing tube 10A on the preset position by each of the locating element 14B.

As shown in FIG. 19A to FIG. 19E, the manufacture method for making the casing tube 10 of the present invention has disclosed.

Firstly, the fiberglass 50 and the resin 60 are mixed together to form mixture of fiberglass and resin in strip shape. One skilled in the art will understand that which mixing the fiberglass 50 with the resin 60, the kneader may be used to fully mix the fiberglass 50 with the resin 60 to make the mixture of fiberglass and resin in strip shape. Also using the flowability of resin make the resin 60 permeate into gaps of the bunches fiberglass 50 to make the mixture of fiberglass and resin in strip shape.

Secondly, a mould core 1000 is provided to bind the strip-shape mixture of fiberglass and resin on the mould core 1000 to make the billets of the casing tube 10. It is understandable that the mixture of fiberglass and resin made the mould core 1000 has a free end which adhered on the mould core 1000 to begin to bind. Also the mixture of fiberglass and resin bound on the mould core 1000 provides bonding force to the free end for melting the free end into the mixture of fiberglass and resin. Accordingly, after the billets of the casing tube 10 is made and the mixture of fiberglass and resin is cut down, the mixture of fiberglass and resin forms a tail end which is pressed to melt in the mixture of fiberglass and resin to form a whole billets of the casing tube 10. It is worth mentioning that one whole bunches of the strip-shape mixture of fiberglass and resin can make one or more the billets of the casing tube 10. Also it is worth to mention that several whole bunches of the strip-shape mixture of fiberglass and resin can make one billets of the casing tube 10. In this case, the free end of the mixture of fiberglass and resin will be completely melted into the mixture of fiberglass and resin.

One skilled in the art will understand that, as binding the mixture of fiberglass and resin on the mould core 1000, one is driving the mould core 1000 to rotate which will bind the strip-shape mixture of fiberglass and resin on the mould core 1000, the other is rotating the strip-shape mixture of fiberglass and resin around the mould core 1000 to bind the mixture of fiberglass and resin on the mould core 1000. Also, the mould core 1000 has arranged with thread structure and the diameter of the mould core 1000 can be chose as required. The casing tube 10 can form the thread portion 121 inside via thread structure of the mould core 1000.

It is worth mentioning that the material of the mould core 1000 is alloy steel, so as not to cohere the mixture of fiberglass and resin on the mould core 1000 for demolding later. Preferably, the mould core 1000 is in type 9SiCr, which during the heat treatment of the mixture of fiberglass and resin the molded casing tube 10 won't be deformed.

It is also worth mentioning that, before binding the mixture of fiberglass and resin, the mould core 1000 is coating with releasing agent for removing the molded casing tube 10 from the mould core 1000 later. For example, the mould core 1000 can be removed from the molded casing tube 10 in a rotating way. Otherwise, for easily demolding of the mould core 1000, the mould core 1000 has taper which size of far end of mould core 1000 is a little smaller than near end of the mould core 1000.

Then, the billets of the casing tube 10 are pressed to mold the mixture of fiberglass and resin. Finally, the casing tube 10 is removed from the mould core 1000 by the demolding process to obtain the casing tube 10.

Preferably, the mould for pressing the billets of the casing tube 10 further has grooves to form each of the locating element 14 on the outer surface of the molded casing tube 10.

Preferably, the casing tube 10 is trimmed for make surface of the casing tube 10 smooth.

As in FIG. 20, the manufacture method of the casing tube 10 in the present invention comprises the following steps.

Step 1: preparing a mixture of fiberglass and resin, wherein the mixture has a strip shape;

Step 2: binding the mixture on a mould core 1000 to obtain a billet for the casing tube;

Step 3: mould pressing the billet to fasten and mold the billet; and

Step 4: demolding and removing the mould core to obtain the casing tube 10.

It is worth mentioning that, in Step 4, first demolding, then removing the mould core 1000 to obtain the casing tube 10; or first removing the mould core 1000, then demolding to obtain the casing tube 10. In these kinds of aspects the invention is not restricted.

In one embodiment, in Step 1, further comprises:

Step 1.1: mixing the fiberglass 50 and the resin 60 to prepare the mixture; and Step 1.2: bunching the mixture to make the mixture have a bunch shape. One skilled in the art will understand that, during the process, the fiberglass 50 can be soaked in the resin 60 to make the resin 60 fully permeated into gaps of the fiberglass 50 to form mixture of fiberglass and resin. Then dealing the mixture of fiberglass and resin in bunches process and form the mixture of fiberglass and resin in bunches shape.

In other embodiment, in Step 1, further comprises:

Step 1.3: making the fiberglass 50 have a bunch shape.

Step 1.4: making the resin 60 permeate into the gaps of the fiberglass 50 to form the mixture having a strip shape. One skilled in the art will understand that, in this step, first making the fiberglass 50 in bunches shape, then the fiberglass 50 is permeated in to the gaps of the resin 60 to form mixture of fiberglass and resin by the flowability of the fiberglass 50.

Preferably, the Step 1.4 further comprises the steps of:

soaking the fiberglass 50 in the resin 60 for the resin 60 permeating into the gaps of the fiberglass 50.

Preferably, the Step 1.4 further comprises the steps of:

making the resin 60 flow through the bunches shape fiberglass 50 for the resin 60 permeating into the gaps of the fiberglass 50.

Otherwise, the manufacturing method of the casing tube 10 further comprises:

Step 5: trimming the casing tube 10 for make surface of the casing tube 10 smooth.

For obtaining the casing tube 10, as in FIG. 21, there is a manufacturing method which comprises steps as following.

(a) Mix the fiberglass 50 and the resin 60 to get a mixture of fiberglass and resin.

In details, using the kneader to fully mix the fiberglass 50 with the resin 60. What needs to explain is that according to the requirement of manufacture and other limitations there are other ways to mix the mixture of the fiberglass the resin. In the above embodiment of the present invention, provided kneader is an example to illustrate application of mixing the mixture of fiberglass and resin which explains the heart of present invention.

(b) Press the mixture of fiberglass and resin to composite and mold the mixture of fiberglass and resin for obtaining a tube body 11, wherein the tube body 11 has at least a retaining element 111.

(c): Couple at least two the tube bodies 11 with each other to define a screw channel 12 therebetween, wherein the retaining element 111 is located in the screw channel 12 to define the casing tube 10.

Further, the manufacturing method further comprises the step of:

(d) Proving at least a fastening unit 13 on the outer surface of the casing tube 10 to fasten each of the tube bodies 11.

Preferably, in step (d), binding the strip mixture of fiberglass and resin on the outer surface of the casing tube 10 so as to form the fastening unit 13 by the strip mixture of fiberglass and resin.

More preferably, in an embodiment of the present invention, soaking the fiberglass in the resin to permeate the resin into the gaps of fiberglass bunches, so as to form the fastening unit 13; in another embodiment of the present invention, making the resin flow through the fiberglass bunches to permeate the resin into the gaps of fiberglass bunches to form the fastening unit 13.

Preferably, in step (b), on the outer surface of each of the tube bodies 11 forming at least one locating element 14, wherein each of the locating elements 14 is enforced meshing force between the casing tube 10 and the sleeper 40 to fasten the casing tube 10 in the sleeper 40. Furthermore, in step (b), overlapping the mixture of fiberglass and resin made by the long fiberglass and resin and the mixture of fiberglass and resin made by the short fiberglass and resin with each other, for forming each of the locating element 14 made by the mixture of fiberglass and resin made by the long fiberglass and resin and forming each of the tube bodies 11 made by the mixture of fiberglass and resin made by the short fiberglass and resin.

Furthermore, the manufacture method further comprises the steps of:

(e) proving a binding layer 15 between the tube bodies 11 for connecting the tube bodies 11 with each other, such that the sealing of the tube bodies 11 of the casing tube 10 will be better.

As in FIG. 22, the present invention has disclosed a manufacturing method to make the casing tube 10 by the fiberglass reinforced resin composite, which comprises steps as following.

(1) preparing the fiberglass reinforced resin composite;

(2) making the fiberglass reinforced resin composite material be in a sol state; and (3) gelling the fiberglass reinforced resin composite material via the casing tube module and demolding to obtain the casing tube 10, wherein the casing tube 10 has a screw channel 12 and a thread portion 121 provided in the screw channel 12.

Further, before step (1), the method comprises the steps of:

(1.1) mixing fiberglass and resin to obtain a mixture of the fiberglass and resin; and (1.2) heating and/or pressing the mixture of fiberglass and resin to composite the fiberglass and resin and form the fiberglass reinforced resin composite in sol state.

Furthermore, the step (1.2) further comprises the steps of:

(1.2.1) forming the fiberglass reinforced resin composite material in sol state by long fiberglass reinforced resin;

(1.2.2) forming the fiberglass reinforced resin composite material in sol state by short fiberglass reinforced resin; and (1.2.3) overlapping the two fiberglass reinforced resin composite materials in the step (1.2.1) and the step (1.2.2).

The step (3) further comprises the steps of:

(3.1) forming at least two tube bodies 11; and (3.2) coupling at least two tube bodies 11 with each other to form the screw channel 12 therewithin to obtain the casing tube 10.

Also, after the step (3.2), the method further comprises a step of:

binding the strip mixture of fiberglass and resin on the outer surface of the casing tube 10 so as to form the fastening unit 13 by the strip mixture of fiberglass and resin.

As shown in FIG. 23, the present invention provides a manufacturing method of a casing tube 10, wherein the method comprises:

(I) Providing at least two tube bodies 11, wherein each of the tube bodies 11 has a curved inner-side surface 130 and at least a retaining element 111 provided on the inner-side surface 130; and (II) Coupling the tube bodies 11 with each other to define a screw channel 12 within the inner-side surfaces 130 of the tube bodies 11 to obtain the casing tube 10, wherein each of the retaining elements 111 is provided in the screw channel 12.

Preferably, the manufacturing method further comprises the step of:

(III) binding at least one fastening unit 13 on the tube body 11, wherein the fastening unit 13 fastens the tube bodies 11 together.

As in FIG. 24, the present invention has disclosed a method to manufacture the casing tube 10, which comprises steps as follows.

(A) preparing a billet for the tube body 11, wherein the size of the billet is no less than the size of tube body 11;

(B) cutting the billet to obtain the tube body 11, wherein the tube body 11 has a curved inner-side surface 130 and at least one retaining element 111 provided on the inner-side surface 130; and (C) coupling at least two tube bodies 11 to define a screw channel 12 within the inner-side surfaces 130 of the tube bodies 11 to obtain the casing tube 10, wherein each of the retaining elements 111 is provided in the screw channel 12.

Preferably, the step (A) comprises the steps of:

(A.1) putting the unmolded material in the mould for the billets of tube body 11; and (A.2) heating and/or pressing the unmolded material via the mould for the billet of the tube body 11 to obtain the billet.

Further, the manufacturing method further comprises the step of:

(D) binding at least one fastening unit 13 on the tube body 11, wherein the fastening unit 13 fastens the tube bodies 11 together.

Furthermore, the manufacturing method further comprises a step of:

arranging a binding layer 15 between a connection between the tube bodies 11 for connecting the tube bodies 11 with each other.

Figure 25:
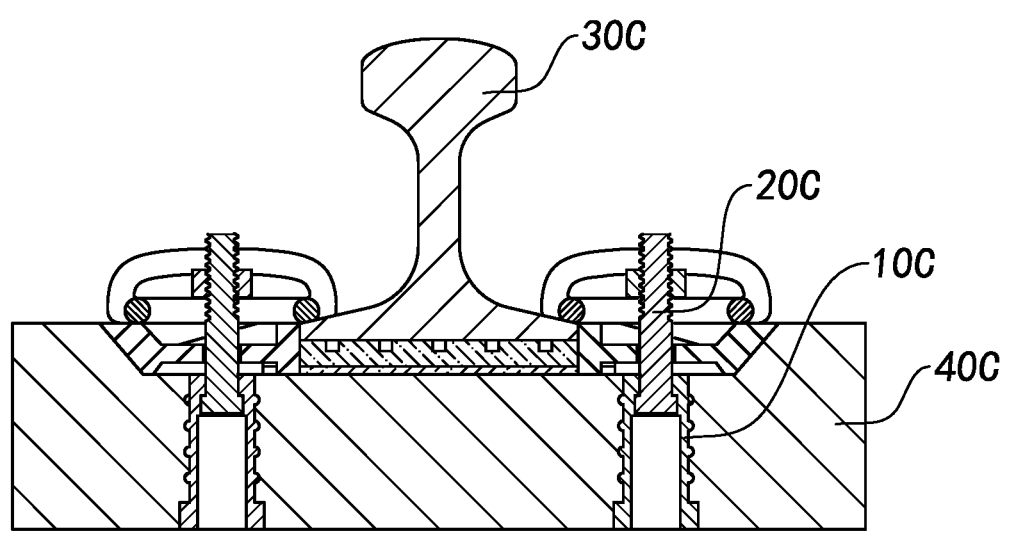
FIG. 25 is a sectional view of the casing tube used in the railroad according to a fourth preferred embodiment of the present invention.
Figure 26:
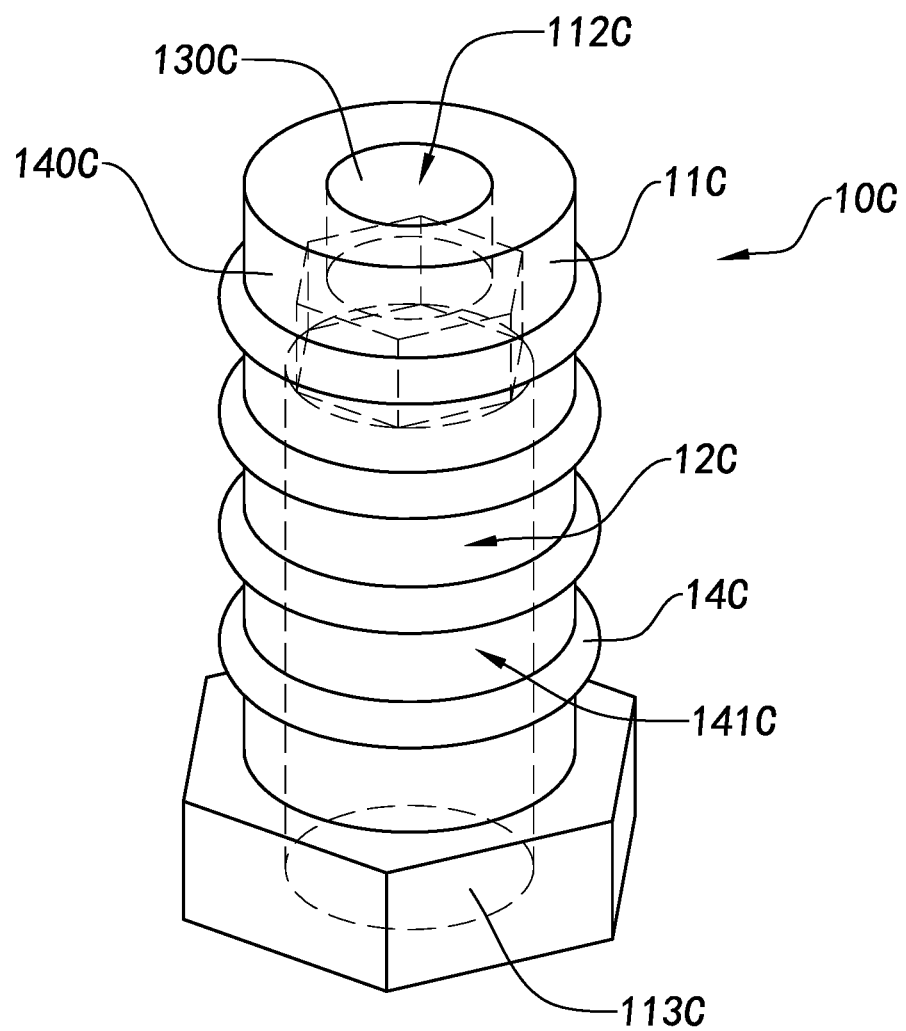
FIG. 26 is a perspective view of the casing tube according to the fourth preferred embodiment of the present invention.

As shown in FIG. 25 to FIG. 28, a casing tube 10C of another preferred embodiment according to the present invention is illustrated. As shown in FIG. 25, a railway transportation system comprises at least one casing tube 10C, at least one screw 20C, at least one rail 30C and at least one sleeper 40C, wherein one casing tube 10C and one screw 20C are correspondingly matched with each other to be pre-embedded in preset position of the sleeper 40C, wherein with a nut the rail 30C can be rapidly fastened in the sleeper 40C to improve efficiency of laying the railway transportation system.

In details, in this embodiment of the present invention, the casing tube 10C comprises a tube body 11C which has an inner-side surface 130C and an outer-side surface 140C corresponding to the inner-side surface 130C, wherein the inner-side surface 130C of the casing tube 10C defines a screw channel 12C for engaging with the screw 20C. It is worth mentioning that one screw 20C can be match to one casing tube 10C to be pre-embedded in the sleeper 40C. Furthermore, the screw 20C can move alone the screw channel 12C of the casing tube 10C, and the direction of movement is same as the extension direction of the screw channel 12C of the casing tube 10C. In this way, when laying the railway transportation, the screw 20C can be adapted to different size of the rail 30C.

Figure 27:
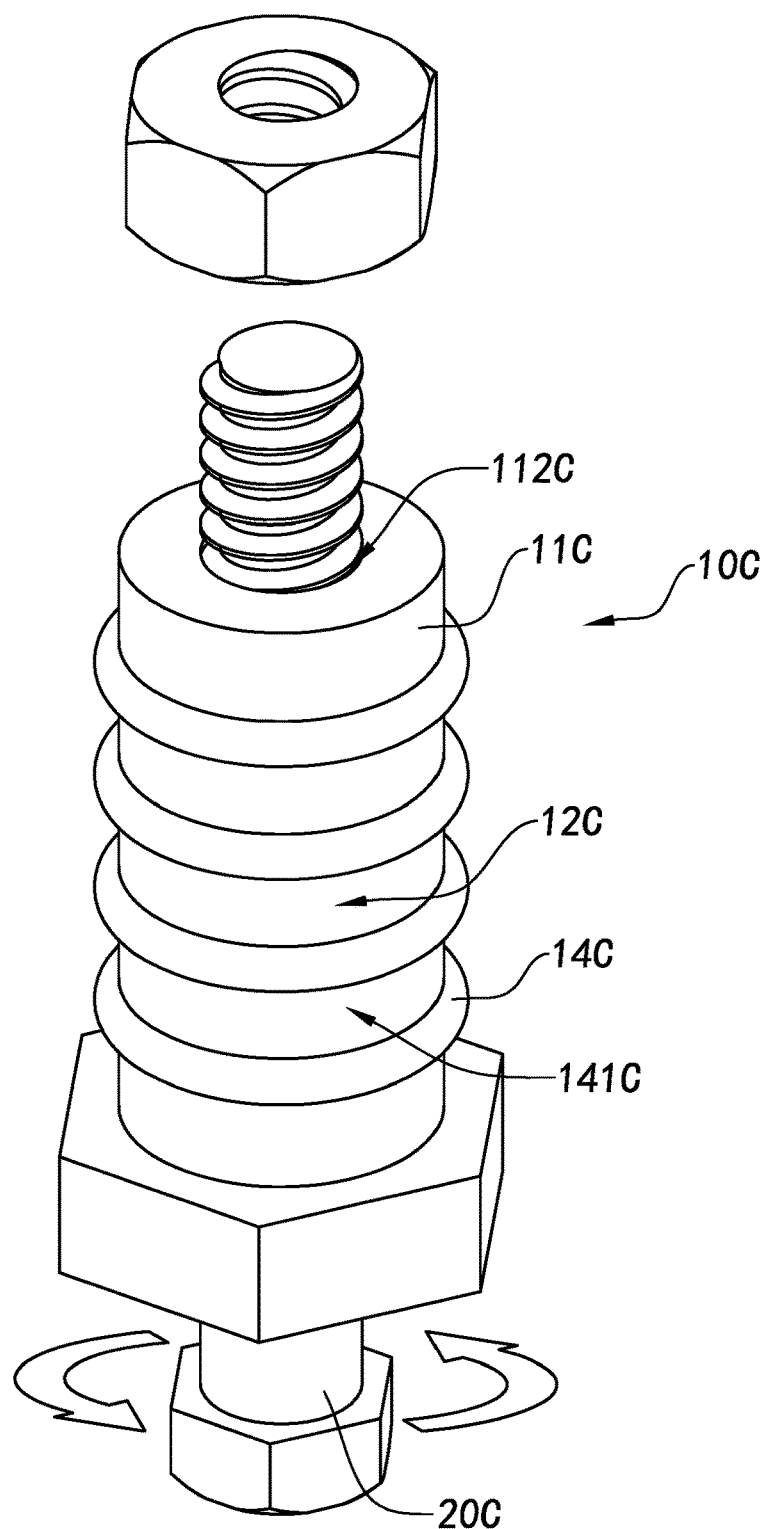
FIG. 27 is an exploded perspective view of the casing tube according to the fourth preferred embodiment of the present invention.
Figure 28:
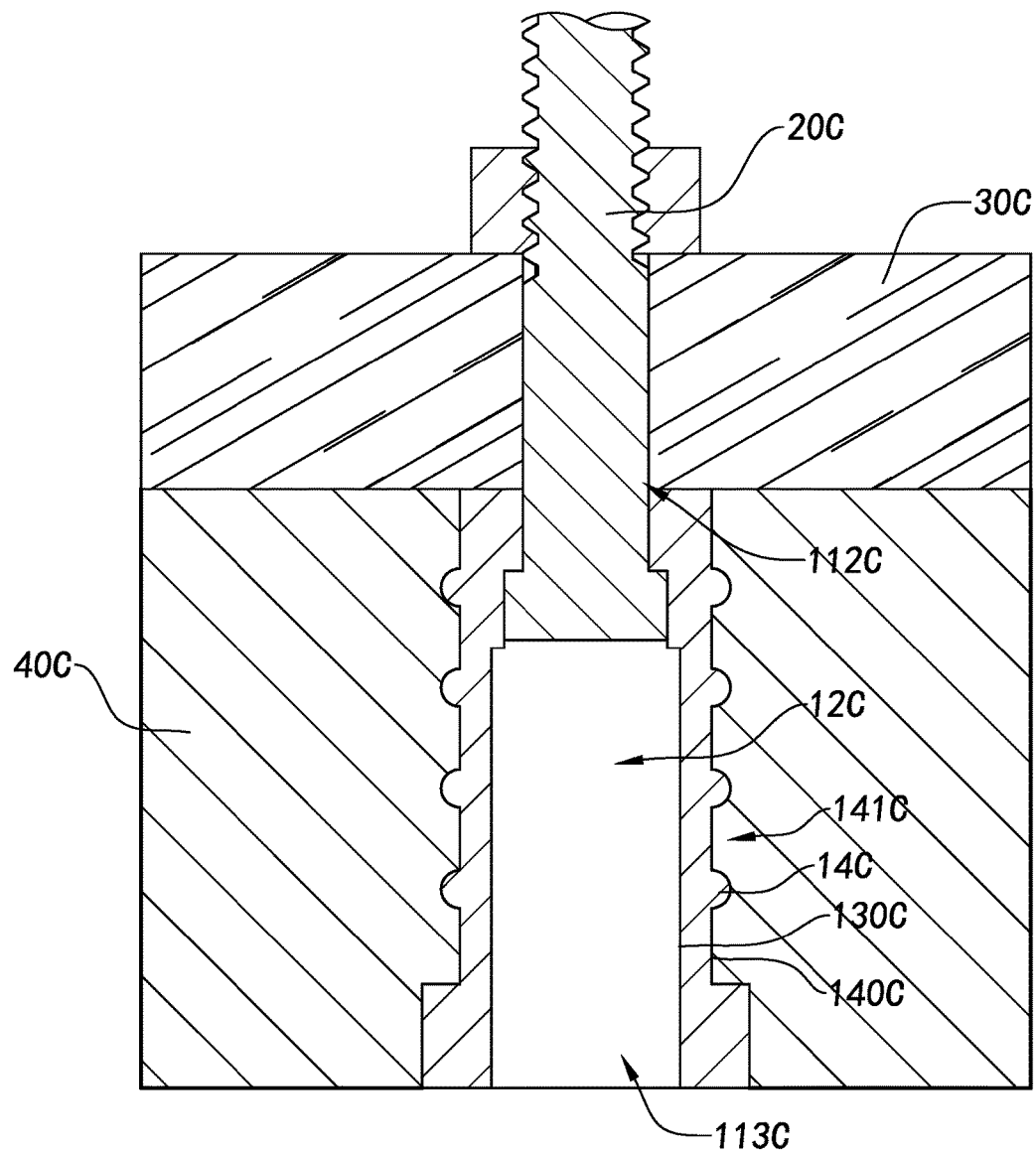
FIG. 28 is a sectional view of the casing tube according to the fourth preferred embodiment of the present invention.

As in FIG. 27 and FIG. 28, the tube body 11C has an upper opening 112C and a bottom opening 113C, which the upper opening 112C and the bottom opening 113C are communicated with the screw channel 12C. The top end of the screw 20C can be through the bottom opening 113C of the tube body 11C into the screw channel 12C of the tube body 11C and, further, out of the upper opening 112C. Thus, after the top end of the screw 20C is through the rail 30C, the rail 30C is locked on the sleeper 40C by the matched nut. The bottom end of the screw 20C can be remained in the screw channel 12C of the tube body 11C. It is worth mentioning that the size of the upper opening 112C of the tube body 11C is smaller than the size of the screw channel 12C of the tube body 11C, and the size of the upper opening 112C of the tube body 11C is larger than the size of bottom end of the screw 20C. In this way, as the screw 20C bears force, the screw 20C will not slide out of the screw channel 12C of the tube body 11C. Thus, the nut and the screw 20C can match with each other to lock the rail 30C on the sleeper 40C.

Furthermore, the outer-side surface 140C of the tube body 11C has at least one locating element 14C for stably pre-embedded the casing tube 10C in the sleeper 40C. In details, every two of the adjacent locating elements 14C form a locating slot 141C. As the casing tube 10C is fastened at the preset position of the sleeper 40C, the material made the sleeper 40C will flow to permeate in the locating slot 141C of the locating element 14C to generate meshing force between the casing tube 10C and the sleeper 40C. As the casing tube 10C is bearing sustainably vibrations, each of the locating elements 14C will stop movement of the casing tube 10C to ensure the stability of the casing tube 10C.

In other embodiment of the present invention, the tube body 11C forms a line of positioner. Thus as the casing tube 10C is pre-embedded in the sleeper 40C, each of the positioner is in different height. According to requirement, the bottom end of the screw 20C can be placed at different height of the positioner, so as to make the part of screw 20C which is out of the upper opening 112C of the tube body 11C adjustable.

Figure 29:
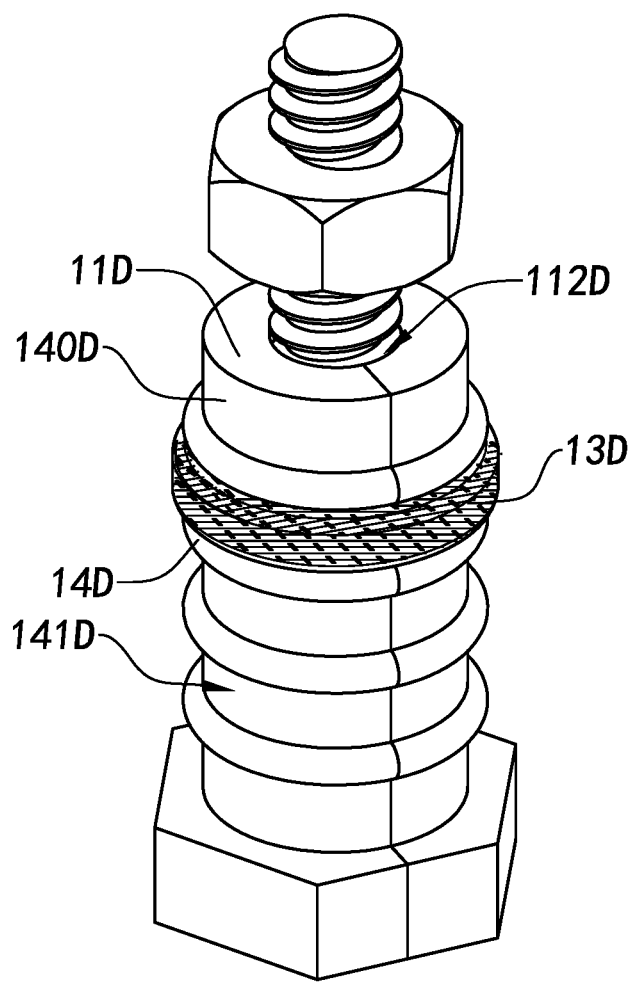
FIG. 29 illustrates an alternative mode of the casing tube according to the fourth preferred embodiment of the present invention.
Figure 30:
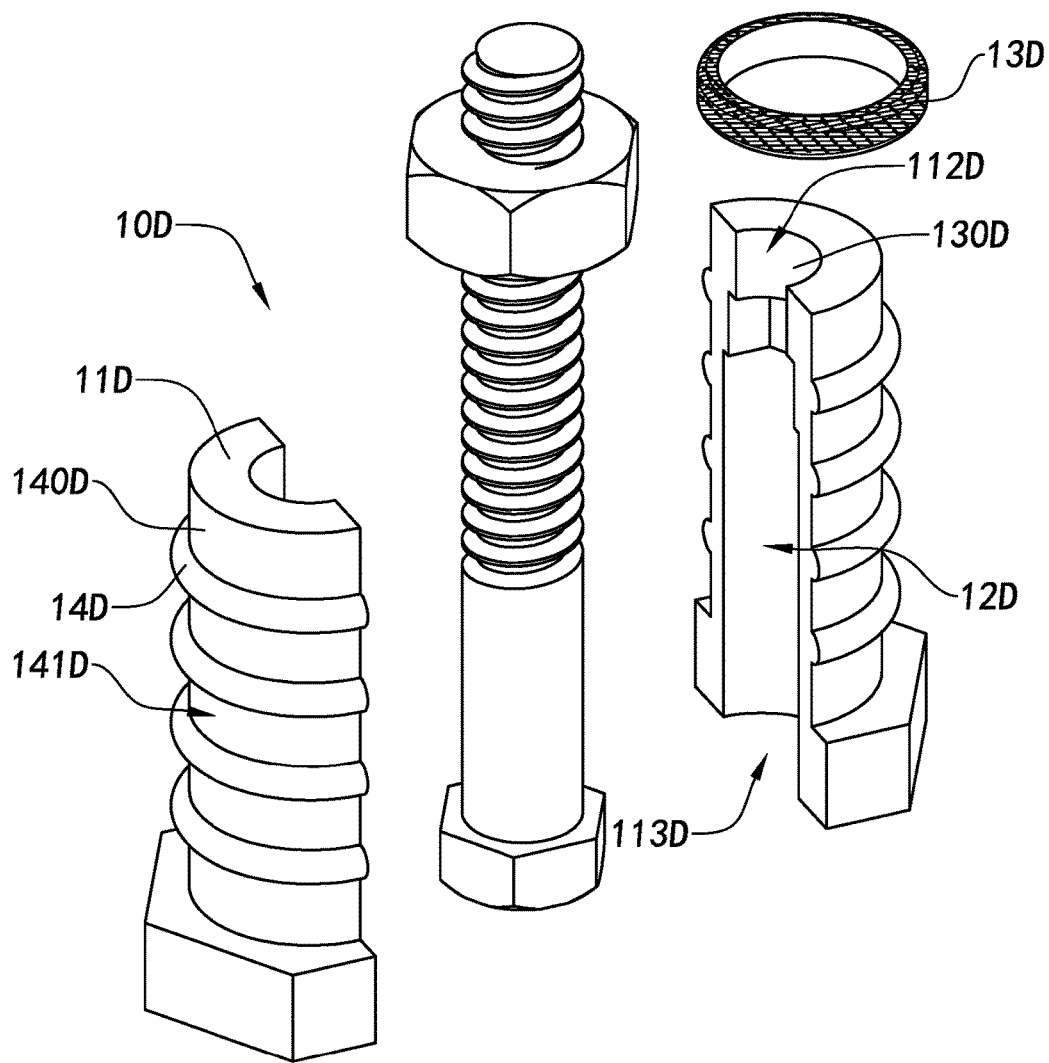
FIG. 30 is an exploded perspective view illustrating the alternative mode of the casing tube according to the fourth preferred embodiment of the present invention.

FIG. 29 and FIG. rail 30 are shown an alternative mode of the above embodiment of the present embodiment. In details, the casing tube 10D comprises at least two tube bodies 11D, wherein each of the tube bodies 11D has an inner-side surface 130D and an outer-side surface 140D corresponding to the inner-side surface 130D. As the tube bodies 11D are coupled with each other to form the casing tube 10D, the inner-side surfaces 130D of the tube bodies 11D forms a screw channel 12D for engaging with the screw 20D. The outer-side surface 140D of each of the tube bodies 11D will contact to the sleeper 40D.

Furthermore, each of the tube bodies 11D has at least one locating element 14D protruded from the outer-side surface 140D for pre-embedding stably the casing tube 10D in the sleeper 40D. In details, every two of the adjacent locating elements 14D forms a locating slot 141D therebetween. As the casing tube 10D is fastened at the preset position of the sleeper 40D, the material made the sleeper 40D will flow to permeate in the locating slot 141D of the locating element 14D to generate meshing force between the casing tube 10D and the sleeper 40D. As the casing tube 10D bears sustainably vibrations, each of the locating elements 14D will stop movement of the casing tube 10D to ensure the stability of the casing tube 10D.

As the tube bodies 11D are coupled with each other to form the casing tube 10D, the tube body 11D has an upper opening 112D and a bottom opening 113D, which the upper opening 112D and the bottom opening 113D are communicated with the screw channel 12D. The top end of the screw 20D can be through the bottom opening 113D of the tube body 11D into the screw channel 12D of the tube body 11D and, further, out of the upper opening 112D. Thus, after the top end of the screw 20D is through the rail 30D, the rail 30D is locked on the sleeper 40D by the matched nut. The bottom end of the screw 20D can be remained in the screw channel 12D of the tube body 11D. It is worth mentioning that the size of the upper opening 112D of the tube body 11D is smaller than the size of the screw channel 12D of the tube body 11D, and the size of the upper opening 112D of the tube body 11D is larger than the size of bottom end of the screw 20D. In this way, as the screw 20D is bearing force, the screw 20D will not slide out of the screw channel 12D of the tube body 11D. Thus, the nut and the screw 20D can match with each other to lock the rail 30D on the sleeper 40D.

The casing tube 10D further comprises one or more fastening units 13D, wherein the fastening units 13D are spacedly encircled around outer surface of the casing tube 10D to fasten the tube bodies 11D together. So, each screw 20D is not only sealed the gap of contact between the tube body 11D better, but also prevented malposition of the tube body 11D under stress by each of the fastening units 13D when the casing tube 10D bears transverse impact force to ensure stability of structure of the casing tube 10D. It is understandable for one skilled in the art, the sleeper 40D is usually made of some material like the ferroconcrete which has larger liquidity while not shaped. As the casing tube 10D is provided at the preset position, and the sleeper 40D is molded during the molding process, the flow of material made the sleeper 40D will generate transverse impact force to the casing tube 10D to make the tube body 11D tend to be malposition. Then, each of the fastening units 13D prevents the tube body 11D to be malposition. Therefore, the material made the sleeper 40D will not be permeated into the screw channel 12D through the gap of contact between the tube bodies 11D. Also the thread portion 121D inside the screw channel 12D formed by the casing tube 10D will not be malposition.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A casing tube for being pre-buried in a railway transport system, comprising:
at least two tube bodies, each having an inner-side surface, an outer-side surface, and at least a retaining element provided at said inner-side surface, wherein when said two tube bodies are coupled with each other to form a tubular configuration, a screw channel is formed within said inner-side surfaces of said tube bodies for receiving a screw, wherein said retaining elements formed a thread portion integrally formed at said inner-side surfaces for engaging with the screw, wherein each of said tube bodies further has a plurality of locating elements spacedly and radially protruded from said outer-side surface, and at least one locating slot formed between two of said locating elements.

2. A casing tube for being pre-buried in a railway transport system, comprising:
at least two tube bodies, each having an inner-side surface, an outer-side surface, and at least a retaining element provided at said inner-side surface, wherein when said two tube bodies are coupled with each other to form a tubular configuration, a screw channel is formed within said inner-side surfaces of said tube bodies for receiving a screw, wherein said retaining elements formed a thread portion integrally formed at said inner-side surfaces for engaging with the screw, wherein each of said tube bodies further has a first side portion and a second side portion extended radially, wherein said first side portions and said second side portions of said tube bodies are coupled with each other when said tube bodies are coupled with each other; and
a binding layer sandwiched between said first side portions and said second side portions of said tube bodies when said tube bodies are coupled with each other.

3. A casing tube for being pre-buried in a railway transport system, comprising:
at least two tube bodies, each having an inner-side surface, an outer-side surface, and at least a retaining element provided at said inner-side surface, wherein when said two tube bodies are coupled with each other to form a tubular configuration, a screw channel is formed within said inner-side surfaces of said tube bodies for receiving a screw, wherein said retaining elements formed a thread portion integrally formed at said inner-side surfaces for engaging with the screw, wherein each of said tube bodies further has a first side portion and a second side portion extended radially, wherein said first side portions and said second side portions of said tube bodies are coupled with each other when said tube bodies are coupled with each other, wherein each of said tube bodies further has a holding member and a holding slot formed at said first side portion and said second side portion respectively, wherein when said first side portions and said second side portions of said tube bodies are coupled with each other, said holding members are engaged with said holding slots correspondingly so as to ensure said two tube bodies to be coupled with each other.

4. A method of manufacturing a pre-buried casing tube for a railway transport system, comprising the steps of:
(a) forming a casing tube having an inner-side surface, an outer-side surface, and a screw channel within said inner-side surface of said tube body for receiving a screw, wherein said tube body is made of fiberglass reinforced resin composite material; and
(b) forming at least a retaining element at said inner-side surface of said casing tube, wherein said retaining element forms a thread portion integrally formed at said inner-side surface for engaging with the screw;
wherein the step (a) further comprises the steps of:
(a.1) forming at least two tube bodies, each of said tube bodies has a curved inner-side surface and a curved outer-side surface, wherein said retaining element is integrally formed at said curved inner-side surface of each of said tube bodies; and
(a.2) coupling said tube bodies with each other to form said casing tube that said curved inner-side surfaces of said tube bodies form said inner-side surface of said casing tube and said curved outer-side surfaces of said tube bodies form said outer-side surface of said casing tube;

wherein the step (a.1) further comprises a step of spacedly and radially protruding a plurality of locating elements from said curved outer-side surface of each of said tube bodies, wherein at least one locating slot is formed between two of said locating elements.

5. A method of manufacturing a pre-buried casing tube for a railway transport system, comprising the steps of:
- (a) forming a casing tube having an inner-side surface, an outer-side surface, and a screw channel within said inner-side surface of said tube body for receiving a screw, wherein said tube body is made of fiberglass reinforced resin composite material; and
- (b) forming at least a retaining element at said inner-side surface of said casing tube, wherein said retaining element forms a thread portion integrally formed at said inner-side surface for engaging with the screw;

wherein the step (a) further comprises the steps of:
- (a.1) forming at least two tube bodies, each of said tube bodies has a curved inner-side surface and a curved outer-side surface, wherein said retaining element is integrally formed at said curved inner-side surface of each of said tube bodies; and
- (a.2) coupling said tube bodies with each other to form said casing tube that said curved inner-side surfaces of said tube bodies form said inner-side surface of said casing tube and said curved outer-side surfaces of said tube bodies form said outer-side surface of said casing tube;

wherein the step (a.1) further comprises the steps of:
- (a.1.1) radially extending a first side portion and a second side portion from each of said tube bodies; and
- (a.1.2) forming has a holding member and a holding slot at said first side portion and said second side portion respectively, wherein when said first side portions and said second side portions of said tube bodies are coupled with each other, said holding members are engaged with said holding slots correspondingly so as to ensure said two tube bodies to be coupled with each other.

6. A method of manufacturing a pre-buried casing tube for a railway transport system, comprising the steps of:
- (a) forming a casing tube having an inner-side surface, an outer-side surface, and a screw channel within said inner-side surface of said tube body for receiving a screw, wherein said tube body is made of fiberglass reinforced resin composite material; and
- (b) forming at least a retaining element at said inner-side surface of said casing tube, wherein said retaining element forms a thread portion integrally formed at said inner-side surface for engaging with the screw;

wherein the step (a) further comprises the steps of:
- (a.1) forming at least two tube bodies, each of said tube bodies has a curved inner-side surface and a curved outer-side surface, wherein said retaining element is integrally formed at said curved inner-side surface of each of said tube bodies; and
- (a.2) coupling said tube bodies with each other to form said casing tube that said curved inner-side surfaces of said tube bodies form said inner-side surface of said casing tube and said curved outer-side surfaces of said tube bodies form said outer-side surface of said casing tube;

wherein the step (a.1) further comprises the steps of:
- (a.1.1) radially extending a first side portion and a second side portion from each of said tube bodies; and
- (a.1.2) providing a binding layer to be sandwiched between said first side portions and said second side portions of said tube bodies when said tube bodies are coupled with each other.

* * * * *